(12) United States Patent
Bayat et al.

(10) Patent No.: US 7,222,995 B1
(45) Date of Patent: May 29, 2007

(54) UNITARY REFLECTOR AND LENS COMBINATION FOR A LIGHT EMITTING DEVICE

(75) Inventors: Bijan Bayat, Plano, TX (US); James Newton, Arlington, TX (US); Michael Thomas, Belmont, MA (US)

(73) Assignee: Bayco Products, Ltd., Wylie, TX (US)

( * ) Notice: Subject to any disclaimer, the term of this patent is extended or adjusted under 35 U.S.C. 154(b) by 7 days.

(21) Appl. No.: 11/335,310

(22) Filed: Jan. 19, 2006

(51) Int. Cl.
*F21V 5/00* (2006.01)
*G02B 17/00* (2006.01)

(52) U.S. Cl. ............... 362/327; 362/308; 362/800; 359/728

(58) Field of Classification Search ............ 362/327, 362/307–308, 800; 359/727–728
See application file for complete search history.

(56) References Cited

U.S. PATENT DOCUMENTS

| | | | | |
|---|---|---|---|---|
| 2,469,080 A | * | 5/1949 | Rosin et al. | 362/327 |
| 2,638,033 A | * | 5/1953 | Buchele et al. | 359/725 |
| 6,449,103 B1 | * | 9/2002 | Charles | 359/725 |
| 6,554,451 B1 | | 4/2003 | Keuper | 362/237 |

OTHER PUBLICATIONS

Product Product Brief: "LED Optic Classic Range;" 2 pp.; copyright 2005; Canclo Tech Plastics, Ltd., 111 Buckingham Ave.,Slough, Berkshire, England SL1 4PF; www.carclo-optics.com.

Product Brief: "4 Degree LED Optic;" 2 pp.; copyright 2005; Canclo Tech Plastics, Ltd., 111 Buckingham Ave., Slough, Berkshire, England SL1 4PF; www.carclo-optics.com.

Product Brief:"FLP Series Lenses for Luxeon (TM) LEDs: I, II, and V, Star and Emitter," 8 pp.; Fraen Srl, Via E. Fermi, 7, Italy; www.fraensrl.com.

Technical Data Sheet: No. DS26; "Power Light Source Luxeon Collimator LXHL-NX05," 3 pp.; copyright 2002; Lumiled Lighting, LLC, 370 West Trimble Road, San Jose, CA 95131; www.lumiled.com.

Reference Design No. DR02 "Luxeon for Flashlight Applications," 6 pp.; copyright 2004;Lumiled Lighting LLC, 370 West Trimble Road, San Jose, CA 95131; www.lumiled.com.

Article: "Microstructured Optics for LED Applications," by Arthur Davis; 27 pp.; Reflexite Display Optics, 1300 Mt. Read Blvd., Rochester, NY 14606; www.display-optics.com.

Webpage: Polymer Optics Ltd. "Our Focus is Plastic".

* cited by examiner

*Primary Examiner*—Ali Alavi
(74) *Attorney, Agent, or Firm*—Whitaker, Chalk, Swindle & Sawyer, LLP; Stephen S. Mosher

(57) ABSTRACT

A unitary lens and light emitting device combination is provided that produces a highly uniform beam of light, corrected for distortions and gaps in illumination, throughout a full output beam width. The unitary lens incorporates all of the necessary optical surfaces to provide the output beam, including a pattern-correcting spherical refracting surface that smooths intensity variations in the overall illumination pattern.

37 Claims, 11 Drawing Sheets

UNITARY REFLECTOR AND LENS COMBINATION FOR A LIGHT EMITTING DEVICE

BACKGROUND OF THE INVENTION

1. Field of the Invention

The present invention generally relates portable lighting apparatus and, more particularly, to optical, mechanical, and electrical features for the design, utility, and performance of portable task lighting and flash light apparatus using very small light emitting devices.

2. Description of the Prior Art

Lighting devices can be grouped into two basic applications: illumination devices and signaling devices. Illumination devices enable one to see into darkened areas. Signaling devices are designed to be seen, to convey information, in both darkened and well-lit areas. Widely available varieties of portable lighting apparatus, which may combine both the illumination type and the signaling type, employ a variety of lighting technologies in products such as task lamps and flashlights. Each new development in technology is followed by products that attempt to take advantage of the technology to improve performance or provide a lower cost product. For example, incandescent bulb technology in small and/or portable lighting products is being challenged by compact fluorescent lamp (CFL) bulbs, often in association with electronic ballast circuits. Other types of incandescent bulbs such as halogen lamps have become standard in a number of ordinary applications. High intensity discharge (HID) and other arc lighting technologies are finding ready markets in automotive and high brightness flood lighting, spot lighting, and signaling applications.

More recently, solid state or semiconductor devices such as light emitting diodes are finding use as compact and efficient light sources in a wide variety of applications. These applications include high intensity personal lighting, traffic and other types of signal lighting, automotive tail lamps, bicycle lighting, task lighting, flashlights, etc., to name a few examples. This technology is relatively new, however, and conventional products heretofore have suffered from a number of deficiencies. For example, current products utilizing light emitting diodes as light sources tend to be highly specialized and suited to only a single use, thus limiting their versatility as lighting devices or instruments for more ordinary uses. Further, such specialized devices tend to be expensive because of the relatively low production volumes associated with specialized applications.

Moreover, there exist certain lighting applications for which conventional light sources are unsatisfactory because of limitations in brightness, operating life, durability, power requirements, excessive physical size, poor energy efficiency, and the like. Newer light sources such as semiconductor light emitting diodes are very small, very durable, use relatively little power, have long lifetimes, and emit very bright light relative to the electrical power input. While some presently available products employ these semiconductor light sources, their full potential is frequently not realized. This may occur because of deficiencies in optical components and drive circuits, or interface components having particular combinations of structure and function are not available. Another factor may be that improvements in the design and configuration of multiple, small, high intensity light sources for maximum illumination efficiency and convenience of use have not been forthcoming.

An advance in the state of the art could be realized if such small, high intensity and high efficiency light emitting devices could be adapted to more general and more versatile lighting applications such as flood lighting or spot lighting. Such advances could occur if improvements in the components, circuits, and product architecture are developed and provided.

For example, in the field of lighting devices used by security personnel, there is a need for high intensity illumination in a battery powered, hand-held instrument that is very rugged, efficient in the use of power, and that provides a beam of light designed to illuminate dark regions of or indistinct objects within an area being patrolled or investigated. Many circumstances require a bright, well-shaped flood light beam for illuminating relatively large areas. Other situations require a more directed beam of light, to spotlight particular areas or objects. Ideally, both modes of illumination would be combined in a single instrument.

SUMMARY OF THE INVENTION

Accordingly, in one aspect of the present invention, there is provided a combination task lamp and flash light, comprising first and second elongated shells forming an elongated, tubular housing having a longitudinal axis, a first section at a first end for containing a plurality of light emitting device (LED) light sources and a second section at a second end for containing a power supply; the first section of the combination including a first directed array of LED/lens assemblies for providing flood light illumination and a second directed light array of at least one LED/lens assembly for providing spot light illumination.

In another aspect of the invention, there is provided a lens for a light emitting device (LED) comprising a combination of an aspherical reflecting surface and a spherical refracting surface. The aspherical reflecting surface has a focal point and a central axis of symmetry—i.e., an optical axis—for reflecting light rays emitted from a compact light source located approximately at the focal point in a forward direction and the reflected light rays are emitted approximately within a predetermined angle with respect to the optical axis. The spherical refracting surface is disposed in the path of the reflected light rays, centered on and normal to the central axis, concave in the forward direction of the reflected light rays and joins the aspherical reflecting surface at a boundary equidistant from the optical axis. The spherical refracting surface includes a plurality of N concentric annular surfaces, each annular surface having a cross section convex in the forward direction and disposed substantially at uniform radial intervals between the optical axis and the junction with the aspherical reflecting surface.

In another aspect of the present invention, there is provided a circuit for illuminating multiple light emitting devices, comprising a current selector circuit connected across a positive terminal and a negative terminal of a DC supply for selecting operating current from the DC supply to each of a first array and a second array of the multiple light emitting devices (LEDs); a switching regulator circuit connected across an output of the current selector circuit for respectively regulating first and second constant drive currents to the first array of LEDs and to the second array of LEDs; a first array of LEDs coupled between a first output of the switching regulator circuit and a common current sense device; and a second array of LEDs coupled between the first output of the switching regulator circuit and the common current sense device; wherein a voltage signal generated by the common current sense device is coupled to a sense input of the switching regulator circuit for regulating the constant drive currents supplied to the first and second arrays of LEDs.

In another aspect of the invention, there is provided a light emitting module comprising a frame configured as a heat sink having first and second opposite sides and a forward axis normal to the first side thereof. Each one of an array of a plurality N of light emitting assemblies (LEAs) connected to a source of current is mounted on the first side of the frame configured as a heat sink such that the central axis of light emission of each LEA is disposed at a non-zero first predetermined angle relative to the forward axis. The frame may include a printed circuit embodying an electric circuit coupled to the array of light emitting assemblies.

In yet another aspect of the present invention, there is provided an electric circuit comprising an electric circuit having an output and a single pole, single throw (SPST) switch having normally open (NO) first and second contacts and a latching mechanism operable by an actuating member. The switch is connected in the electric circuit for activating at least a conducting path in the electric circuit wherein the switch is sequentially operable in first, second, and third states corresponding respectively to latched engagement, momentary disengagement, and latched disengagement of the first and second contacts in the switch. The first state provides activation of the electric circuit in an OFF condition, the second state provides momentary activation of the electric circuit in an ON condition, and the third state provides latched activation of the electric circuit in an ON condition.

In yet another aspect of the present invention, there is provided a method of operating a single pole, single throw (SPST) switch in three distinct states in an electric circuit. The method comprises the steps of providing in an electric circuit having at least an output a SPST normally open (NO) switch for activating at least a conducting path in the electric circuit, the switch having first and second contacts and a latching mechanism operated by an actuating member; providing a first state wherein the latching mechanism is activated, the first and second contacts are engaged, and the electric circuit is in an OFF condition; providing a second, momentary state by exerting a first force upon the actuating member of the SPST switch, sufficient to disengage but not latch the first and second contacts, thereby causing the electric circuit to enter a temporary ON condition during the second state, wherein release of the first force upon the actuating member causes restoration of the first state; and providing a third state by exerting a second force greater than the first force upon the actuating member of the SPST switch, wherein the latching mechanism is activated and the first and second contacts are disengaged, causing the electric circuit to remain in an ON condition. A repeated exertion of the second force upon the actuating member of the SPST switch causes engagement of the first and second contacts, causing in turn the electric circuit to enter the OFF condition.

BRIEF DESCRIPTION OF THE DRAWINGS

The foregoing aspects and other objects of the invention disclosed herein will be understood from the following detailed description read with reference to the accompanying drawings of one embodiment of the invention. Structures appearing in more than one figure and bearing the same reference number are to be construed as the same structure.

DETAILED DESCRIPTION OF THE INVENTION

Figure 1:
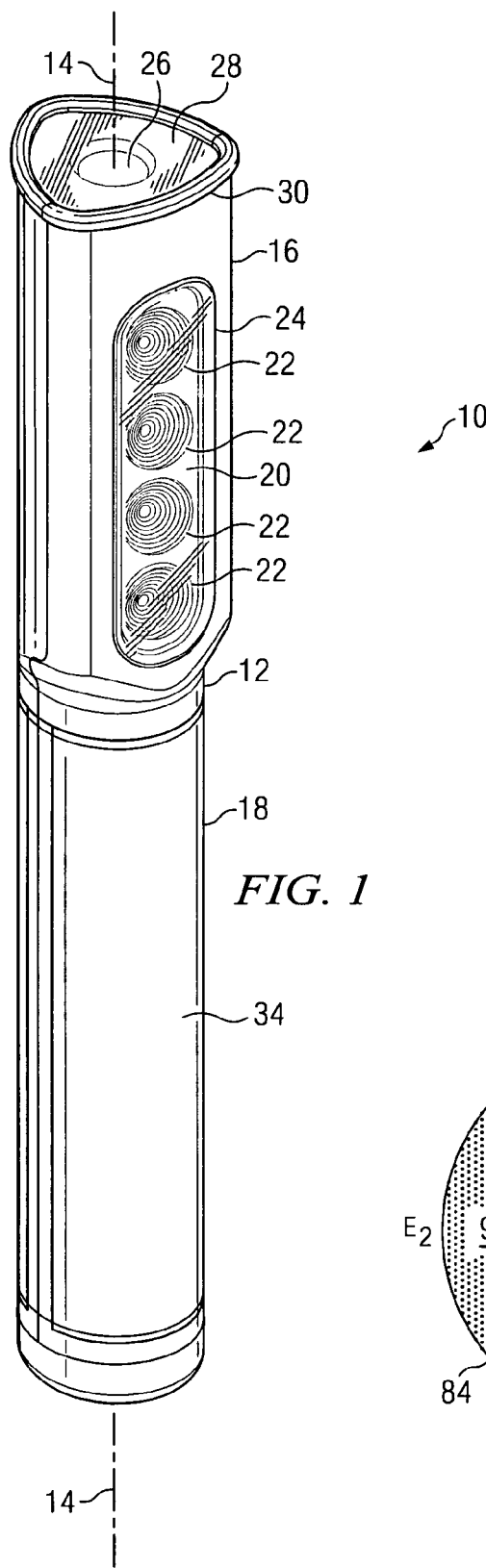
FIG. 1 illustrates one embodiment of a perspective view of a combination task lamp and flash light according to the present invention that provides both flood and spot light illumination.

Referring to FIG. 1, there is illustrated one embodiment of a perspective view of a portable, combination task lamp and flash light (also referred to herein as a portable lighting device 10 or "PLD 10," that provides both flood and spot light illumination, and is constructed according to the present invention. The PLD 10 includes an elongated tubular housing 12 defined along a longitudinal axis 14, having a first section 16 at a first end for containing a plurality of light emitting assemblies or light sources 22, and further having a second section 18 at a second end for containing a power supply (See FIG. 7). Visible through a clear side lens 24 in FIG. 1 is a bezel 20 that locates the forward surfaces of four light sources 22 substantially in a row. The side lens 24 is an internal component of the housing 12 as will be further described with FIG. 7. The row of four light sources 22 may be denoted as a first directed array of light sources 22. Any number of individual light sources 22 may be arranged in a variety of configurations to form a directed array. In the present illustrative embodiment, the configuration of four light sources 22 disposed in a row is selected to illustrate the principles of the invention in a specific product application.

In general, each of the light sources 22 may be a combination of a light emitting device (LED) and a lens assembly. The combination of an LED and a lens assembly may further be denoted as a light emitting assembly (LEA) or as a lens/LED assembly. An LED may be a semiconductor light emitting diode or it may be a light emitting device employing a different technology to produce light. A lens assembly may be a single, solid body of optical material having one or more predetermined optically responsive surface configurations or it may be constructed as a combination of separate, predetermined optical elements assembled into a single unit. In the illustrated embodiment, the lens is a solid body element having a plurality of predetermined surface configurations that is designed for use with certain types of light emitting diodes.

Continuing with FIG. 1, a clear top lens 28 of a second directed light array 26 is disposed in the end of the first section 16 of the elongated housing 12. Although the clear top lens 28 indicates that a single light source is shown in the illustrative embodiment, it is possible that several individual light sources may be used to construct the second directed light array 26. The second directed light array 26 visible through the clear top lens 28 may be configured as a spot light beam or as a flood light beam. Typically, with a PLD 10 having a first directed light array 22 configured to provide a flood light beam, the second directed light array 26 may be advantageously configured as a spot light beam. As will become apparent, when using very small or compact light sources, the type of light beam provided is largely dependent upon the lens assembly provided for the light source. Generally, the light source for the second directed light array 26 may be aligned such that its optical axis is coincident with or aligned parallel with the longitudinal axis 14. In other applications, the alignment of the second directed array 26 may be disposed at an angle (fixed or adjustable) relative to the longitudinal axis. In such cases, the optical axis of the second directed light array 26 would be aligned at a non-zero angle with respect to the longitudinal axis.

At the end of the first section 16 of the elongated housing 12 a lens frame 30 disposed over the second directed light array of lens 26 is provided to protect the clear top lens 28. The lens frame 30 may be formed as part of the elongated housing 12 or implemented as a separate component. It will be observed that the lens frame 30 has a three-sided, tubular shape, i.e., a substantially triangular shape wherein the three sides bulge slightly outward as with a convex surface. This triangular shape mimics the shape of the cross section of the elongated housing 12 in the first section 16. In the illustrated embodiment, the triangular cross section of the first section 16 may be configured to merge with a substantially round or oval cross section of the second section 18. The triangular shape is provided so that when the PLD 10 is placed on a horizontal surface, the PLD 10 naturally assumes an orientation so that the flood light beam from the first directed light array is projected upward at an angle from the horizontal. This is a useful feature when both hands must be free to work.

At the opposite end of the elongated housing 12, the second section 18 may be configured to contain a power supply such as a battery pack. The external portions of the second section 18 may be formed as a handle or with other features to provide a comfortable or a non-slippery gripping surface. A removable end cap 32 may be provided for access to the interior of the second section 18 of the elongated housing 12 such as to replace a battery. In other applications the cap 32 may include a connector for a line cord (not shown in FIG. 1) to supply external power to a power supply converter or battery charger contained within the second section 18, for example.

Figure 2:
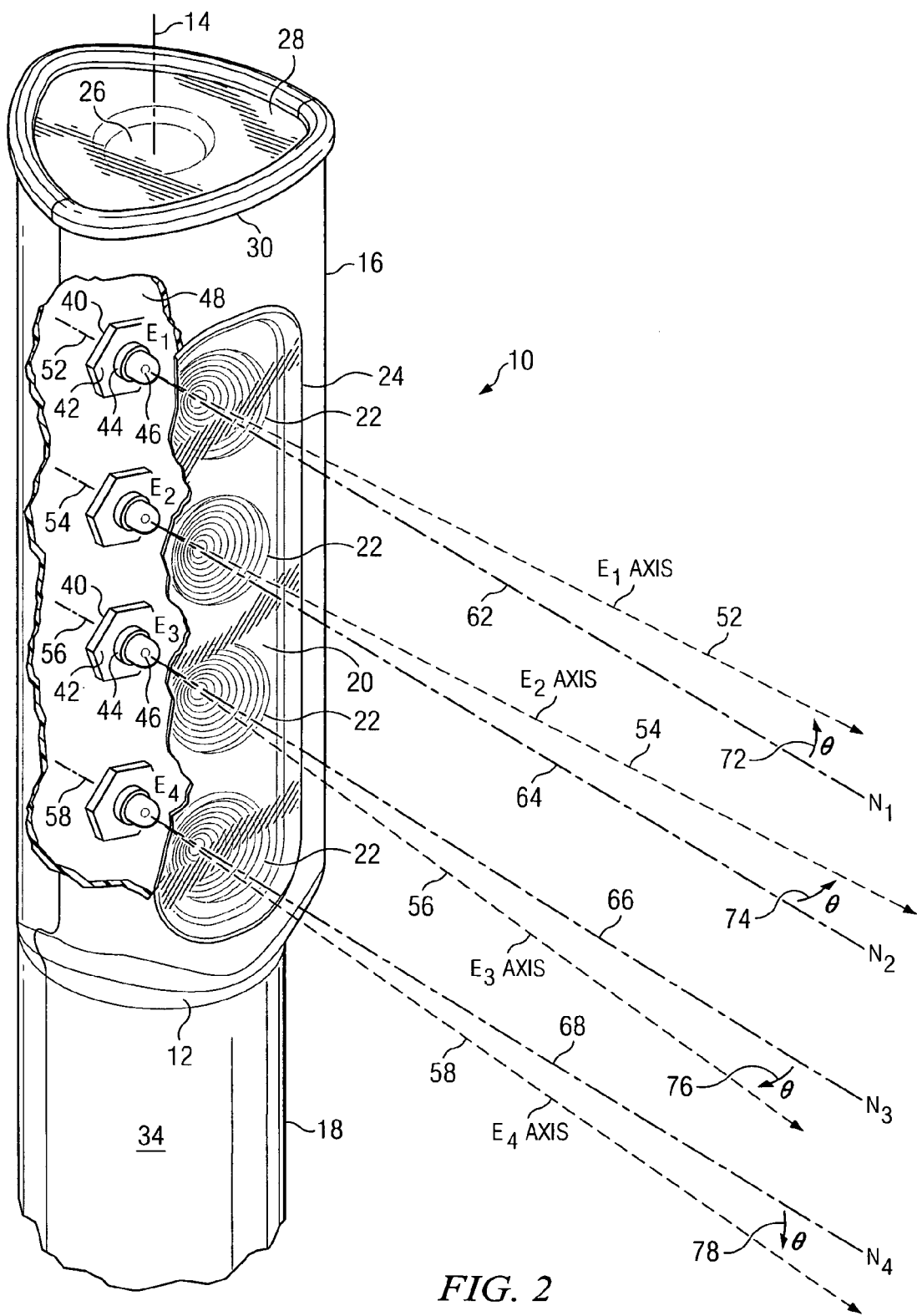
FIG. 2 illustrates a perspective view of the embodiment of FIG. 1 showing a preferred configuration of light emitting assemblies and the directionality of their respective emissions of light.

Referring to FIG. 2, there is illustrated a perspective view of the embodiment of FIG. 1 showing a preferred configuration of light emitting assemblies and the directionality of their respective emissions of light. As will be described further with FIGS. 4A, 4B, and 4C infra, each of the light sources 22 is an assembly of a light emitting assembly (including a light emitter or light emitting device) and a lens assembly. In FIG. 2, each of the light sources 22 is shown aligned with respect to an associated light emitter (designated as E1, E2, E3, and E4) along an optical axis thereof. The light emitting assembly including the light emitter and the lens assembly share the same optical axis. In the example illustrated in FIG. 2, the optical axis (designated by a dashed line) of the light emitter of each light source 22 is disposed at an angle θ with respect to a normal reference line (designated as N1, N2, N3, and N4) at the location of each light source 22. It is known to persons skilled in the art that a "normal" reference line is oriented perpendicular to a plane surface, in this case to the plane surface 48 on which the focal point of the individual light emitter is located. The angle θ will be described in further detail herein below.

Each of the light emitters E1, E2, E3, and E4 are shown mounted on the plane surface 48 in the interior of the elongated housing 12. The light sources 22, associated with each of the light emitters are not fully illustrated so that the relationship of the light emitters E1, E2, E3, and E4 and the elongated housing 12 may be more clearly illustrated. In the illustrated embodiment, a light emitter may be a light emitting diode having an active element (See also FIG. 4C) mounted inside a hemispherical dome 40 on a base 42. The base 42 may be attached to a substrate 44, such as a printed circuit board. The substrate 44 may be a laminated structure that includes a bottom layer (not shown) of thermally conductive material such as aluminum. The aluminum layer provides an integral heat sink for the light source emitter assembly for low power applications and a suitable conductive bonding surface for higher power applications where more heat must be dissipated via an external heat sink in contact with the substrate 44. In the illustrated example, the plane surface 48 is preferably configured as such external heat sink for conducting heat away from the light emitting assembly and dissipating it into the surroundings. A thermal compound of the type well known in the art may be placed in the interface between the substrate 44 and the plane surface 48.

As described previously, an optical axis is defined for each of the light sources 22. In the illustrated embodiment, the optical axes are defined at an angle θ with respect to the normal line defined for each of the light sources 22. The same angle θ is used in this particular embodiment for all four of the light emitting assemblies for reasons which will be described. Thus, the optical axis 52 for the E1 emitter is shown by the dashed line labeled "E1 Axis" and bearing reference number 52. Optical axis 52 is defined to be oriented vertically upward relative to the normal line 62 (N1), from the perspective of the PLD 10, at the angle indicated by the symbol θ. Similarly, optical axis 54 (the E2 axis) is defined to be oriented horizontally leftward relative to the normal line 64 (N2), from the perspective of the PLD 10, at the angle indicated by the symbol θ. Similarly, optical axis 56 (the E3 axis) is defined to be oriented horizontally rightward relative to the normal line 66 (N3), from the perspective of the PLD 10, at the angle indicated by the symbol θ. Likewise, optical axis 58 (the E4 axis) is defined to be oriented vertically downward relative to the normal line 68 (N4), from the perspective of the PLD 10, at the angle indicated by the symbol θ. Thus, each of the light sources 22 is oriented or aimed at the angle θ relative to a normal reference line perpendicular to the plane surface 48 at the location of the particular light source 22.

Moreover, in an array of N light emitting assemblies supported on a common planar base having a normal forward axis, the individual optical axes of the light emitting assemblies will be disposed such that they diverge from a reference line parallel to the forward axis by the angle θ. Further, the individual planes containing the reference line and the optical axis of each light emitting assembly are disposed at substantially equal angles from each other, in the manner of spokes of a wheel when viewed from a point on the forward axis looking back toward the origin of the forward axis. This arrangement of the optical axes of the individual light emitting assemblies is shown in FIG. 2 for an array of N=4 emitters arranged in a straight line on a flat common planar base. As will be described, the orientation of the optical axes of this array at the angle θ of approximately 5 degrees (5°), wherein each light emitting assembly provides a beam of light having a beam width angle of approximately 40 degrees (40°), a composite beam pattern of high brightness and uniformity of cross section is provided.

It should be appreciated that the optical axes of opposing pairs of light emitting assemblies in such an array diverge by twice the angle θ, which in the illustrated embodiment is 2×5°=10°. During the development of the present invention, it was discovered that the relationship between the amount of divergence between two light emitting assemblies in an array (here 10°) and the beam width angle of the individual light emitting assemblies in the array (here 40°) turns out to be an optimum relationship for producing a high brightness, high uniformity composite beam cross section. The relationship may be stated as the ratio of the divergence angle to the beam width angle. In this example it is one to four, or a "one quarter beam width" index or figure of merit. Thus, for a given beam width from a light emitting assembly having a substantially point source light emitter and a lens assembly configured to produce the given beam width, the optimum amount of divergence between two such light emitting assemblies or pairs of such light emitting assemblies turns out to be one quarter of the beam width of the individual light emitting assemblies. This index is very useful in devising arrays of light emitting assemblies to provide a particular composite beam of light or illumination pattern from the array, as will become more apparent in the detailed description which follows.

Continuing with the description of FIG. 2, when the plane surface 48 is a flat surface, all four of the normal lines at each of the light source positions are parallel to each other. In the illustrated embodiment, the light sources are disposed in a row because of the space limitations of the elongated tubular housing 12. However, in an embodiment that allowed the four light sources to be clustered close together on a flat plane surface in a rectangular array, for example at the four corners of a square, the normal lines may be closer together and, in fact, a single normal line placed at the center of the array could serve as the reference for all four of the light sources. In such an embodiment, the light sources would still be advantageously oriented with their optical axes diverging from the common normal line by the angle θ. Further, each of the four light sources would also be divergent in a direction that is at right angles from the direction of divergence of each of its neighboring light source. Thus, the optical axes—and the respective light beams—of the four light sources are aimed in a manner that mimics the four compass directions N, W, S, and E, or, the four spokes of a wheel wherein the spokes are 90° apart.

The same aiming arrangement is provided in the illustrated embodiment of FIG. 2, where the four light sources 22 are arranged in a row. That is, the optical axes of the light sources 22 diverge in the compass directions N, W, S, and E, when viewed from the position of the longitudinal axis 14, even though the light sources 22 are arranged in a single row and are somewhat more widely spaced. In either of the described embodiments, as illustrated in FIG. 2 or in the preceding paragraph, from the perspective of the PLD 10, the beam from light source E1 diverges northward, E2 diverges westward, E3 diverges southward, and E4 diverges eastward. Thus, the respective beam cross sections, as the composite beam is projected on a flat wall surface, will include some overlap. This characteristic will be shown in FIG. 3 to be described.

Figure 3:
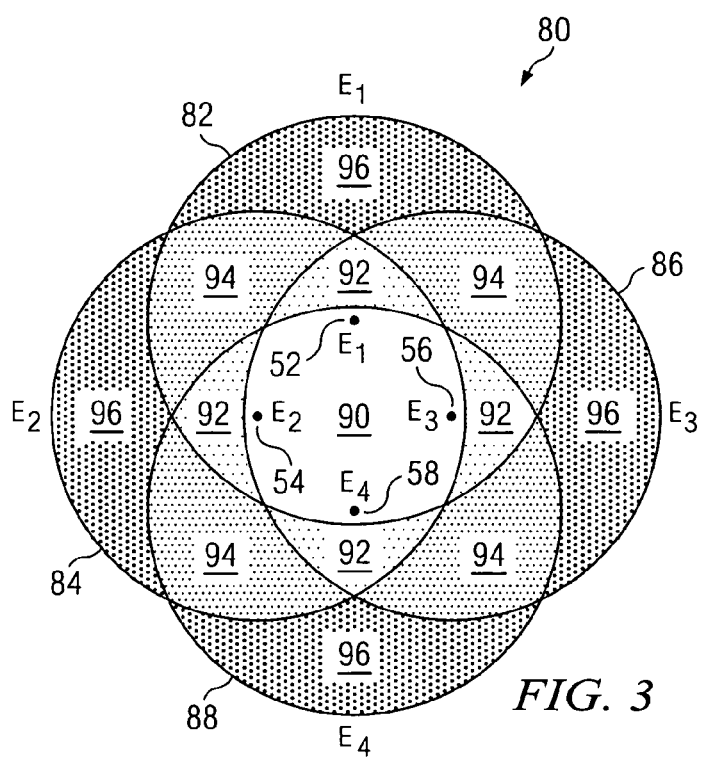
FIG. 3 illustrates a plan view of a flood light pattern on a flat target surface at a nominal distance from the embodiment of FIG. 1, showing the overlapping of beams of light from individual emitters.

In the illustrative embodiment, the angle θ is a non-zero angle typically less than approximately ten degrees (10°). In the preferred embodiment, θ is approximately 5°. This amount of divergence provides an enhanced flood light pattern when projected on a plane surface at a distance of three to four meters, as shown in FIG. 3, to be described. Experimentation has shown that the angle θ is dependent on the design of the lens assembly, particularly the factors of the lens assembly that affect the angle β of the beam width. The beam width angle β is the angle between the sides of a cone that defines the locus of the light rays emitted from a light source located at the apex of the cone. Further, as described herein above, the beam width angle β, the optical axis divergence angle θ, and the properties and positions of the aspherical surfaces of the lens assembly may be adjusted according to the one quarter beam width index to produce the brightest, most uniform flood light pattern at a distance of three to four meters in the illustrative embodiment. The relationships of these parameters will become clearer in the description which follows.

In some embodiments, the plane surface 48 shown in FIG. 2 may be curved to provide a particular orientation of the light emitting assemblies mounted thereon. Thus, with the focal points of the light emitting assemblies coincident with the plane surface 48, bending the plane surface to provide a predetermined curvorients the optical axes of the individual light emitting assemblies to conform to other beam configurations. In such cases the forward axes may be defined at the location of each of the light emitting assemblies. Further, the optical axes of the individual light emitting assemblies may be oriented at non-zero or zero angles with respect to the reference forward axis at a particular location on the plane surface 48. In yet other embodiments the curvature or departure from flat of the plane surface 48 may be adjustable, either in production or by the user, to produce several beam outputs adapted to different applications. In the example described above, bending the plane surface 48 is by way of illustration and not intended to limit the choice of design or method available to the designer. Other design configurations may of course be implemented to configure the mounting surface for the light emitting assemblies with the desired curvature.

Referring to FIG. 3, there is illustrated a plan view of an overall flood light pattern projected on a flat target surface at a nominal distance from the embodiment of FIG. 1, showing the overlapping of beams of light from individual emitters to form a composite beam 80. FIG. 3 will be best understood when viewed in combination with FIG. 2. Each of the regions identified in FIG. 3 are distinguished by the relative amount of shading applied to the various regions. Thus, light emitter E1 having an optical axis 52 provides a projected beam cross section or pattern 82. Similarly, light emitter E2 having an optical axis 54 provides a projected beam cross section or pattern 84. Similarly, light emitter E3 having an optical axis 56 provides a projected beam cross section or pattern 86. Likewise, light emitter E4 having an optical axis 58 provides a projected beam cross section or pattern 88.

Continuing with FIG. 3, the result of combining the respective patterns 82, 84, 86, and 88 produces the overlap region 90 in the center portion of the composite beam 80, where all four of the beams overlap. In this central region 90, the pattern resembles a square with rounded sides that bulge outward, roughly approximating a round region. Three of the beam cross sections from light emitters overlap in the four regions identified with the reference number 92. Two of the beam cross sections from light emitters overlap in the four regions identified with the reference number 94. The four regions identified with the reference number 96 results from the light emitted by a single light emitter. One characteristic about the composite beam pattern 80 produced by all four light beams is that it is approximately round and provides a brightness that is substantially uniform at all angles around the center of the pattern and varies uniformly with distance from the center. Such a pattern balances the light outputs to maximize the utility in a flood lighting application.

The degree of overlap in the projected composite beam pattern 80 of FIG. 3 may be adjusted by variations in the angle of the respective optical axes of the individual light emitters. For lighting instruments intended for illumination at certain distances or within a specified range of distances, the optical axis angles of the light emitters may be adjusted accordingly. In the preferred embodiment illustrated and described herein, the angle of the optical axes relative to the reference normal is approximately 5° to provide the pattern illustrated in FIG. 3 on a target approximately 3 to 4 meters away. In the illustrated embodiment, the optical axes are disposed at a fixed angle because the individual light emitters are mounted on a single heat dissipating frame (heat sink) to be described in detail herein below with FIG. 8C. In other embodiments the angles of the optical axes may be configured to be adjustable to increase the versatility of the PLD 10. Further, the symmetry of the overall pattern is readily apparent in FIG. 3; however, the symmetry is dependent on the uniformity of the alignment of the respective optical axes as will be appreciated by those skilled in the art.

Figure 4B:
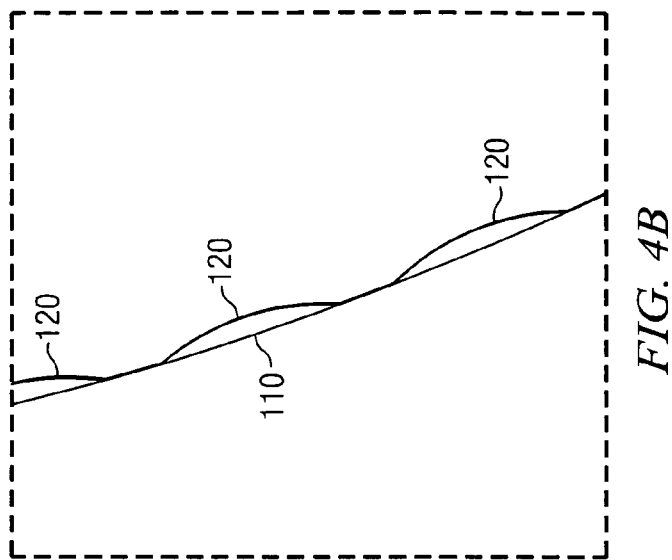
FIG. 4B illustrates an enlarged cross section of a portion of FIG. 4A to show detail thereof.
Figure 4A:
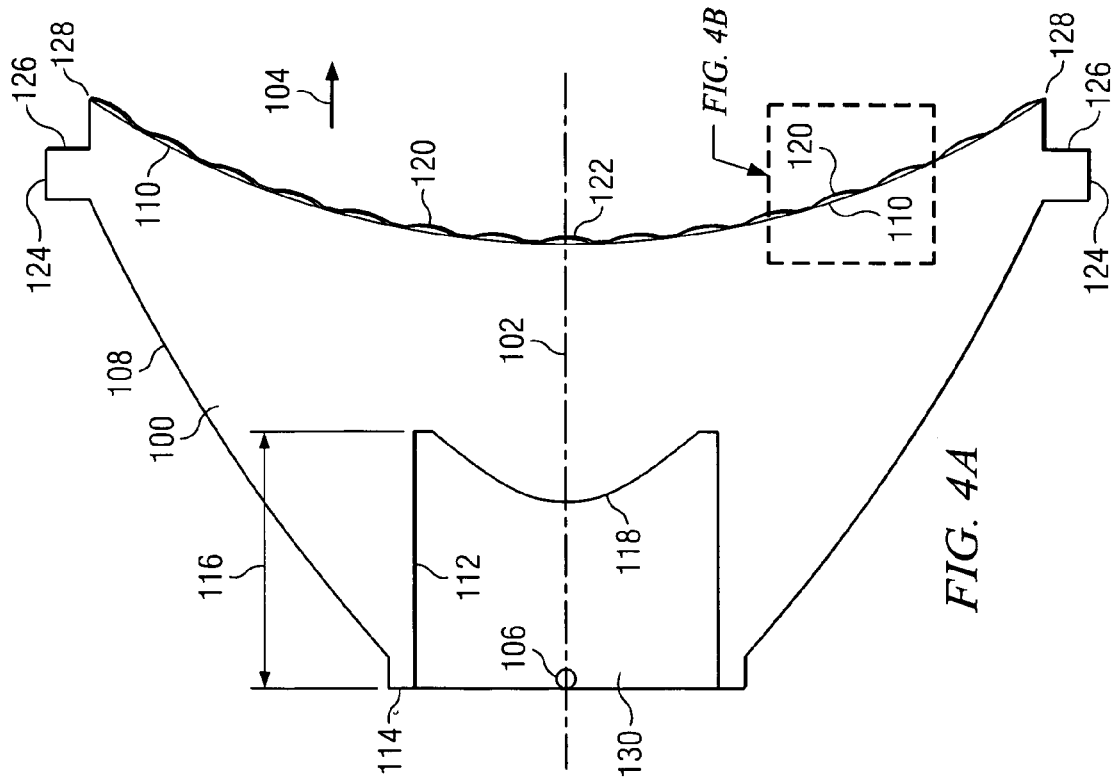
FIG. 4A illustrates a cross section profile of a solid body lens for use with each light emitting device in the embodiment of FIG. 1.

Referring to FIG. 4A, there is illustrated a cross section profile of a solid body lens assembly 100 for use with each light emitting device of the first directed array of LEDs 22 in the embodiment of FIG. 1. The lens assembly 100 may be molded or cast from a clear, optical grade material having an index of refraction n within the range n=$\sqrt{2}$ to 2.00, and preferably within the range of n=1.45 to 1.60. Thermoplastic materials such as polycarbonate (PC), polymerized methyl methacrylate (PMMA, or "acrylic"), or polyethylene terephthalate (PET) are generally suitable. In the preferred embodiment, polycarbonate (PC) is selected for its stability within the temperature range of −60° F. to +270° F., as compared to acrylic having an upper temperature limit of approximately 160° F. (PMMA Grade 8). While both PC and acrylic have a refractive index n=1.49, acrylic has slightly better light transmission (92% vs. 89%) and better resistance to ultraviolet (uv) radiation, the higher temperature limit of PC is determinative in this application wherein the lens units are fairly close to the heat sink surfaces within the elongated housing 12.

Many variables affect the selection of material for the lens and the production of the lens. These factors include (a) the purity of the material, which must have the clarity of pure water ("water clear"); (b) the density of the material vs. the computer model of it; (c) the dimensions and tolerances of the lens; (d) the response of the material to temperature changes and nearby heat sources; (e) the method of manufacture; and (g) the produceability of details of the lens surface in a cost effective die and process. An additional consideration is the material selected for the over lens components (24, 28 in FIG. 1) which is also polycarbonate. Important factors in the selection of the material for the over lens 24, 28 are light transmission ability, refractive index n, and the distance between the lens assembly 104 and the over lens 24 or 28.

The lens assembly 100, or, simply, lens 100, is shown in cross section in FIG. 4A as aligned along its centerline or optical axis 102. The lens 100, when implemented as a molded or cast solid body unit, is bounded by several surfaces, all concentric about or centered on the optical axis 102. Further, as shown in the figure, the lens 100 is oriented to the right, defined as the forward direction 104 of the emission of light from the lens 100. When an active light emitting device is located at a focal point 106 of the lens 100, the emitted light is reflected and refracted in the lens to direct it in the forward direction 104 and disperse the light uniformly within a cone-shaped beam along the optical axis 102. The cone-shaped beam is said to have a beam width defined by the beam angle $\beta$. In the preferred embodiment, the beam angle $\beta$ is approximately 40°. Although such lenses are frequently known as "collimating lenses," this term is only accurate if the light rays forming the beam emerge from the lens substantially in parallel. In the lens 100, the light rays emerge from the lens 100 in angles relative to the optical axis varying from zero to approximately 20°+/−5°. This angle is often called the "half angle" of the beam, denoted herein by the Greek letter $\alpha$. The beam angle denoted by $\beta$ is thus equivalent to two times the half angle $\alpha$. The beam emitted from the lens 100 will be further described with FIG. 4C.

Continuing with FIG. 4A, the optical properties of the lens 100 are determined by five kinds of surfaces, all of which are located at the physical boundaries of the lens 100. The first surface to be described is an aspherical reflecting surface 108 having a focal point 106 on the optical axis 102. The aspherical reflecting surface 108 reflects light rays emitted from a light emitting source located approximately at the focal point 106 in the forward direction and comprises substantially all of the outer boundary of the lens 100. The reflecting surface 108, having a curved profile defined by an aspherical polynomial, provides total internal reflection of light rays emitted from the light emitting source located at or near the focal point 106 that exceed a so-called "critical angle" to be defined herein below. The polynomial may generally be of the form of a parabola or other generalized polynomial and may readily be defined by persons skilled in the art using optical design software available for the purpose. For example, in the illustrated embodiment, the curve of the aspherical reflecting surface 108 is of the general form $$y = a + b_1 x + b_2 x^2 + b_3 x^3.$$

As will be understood by persons skilled in the art, the coefficients of the independent variable x in the above equation may be chosen based on the particular surface profile desired.

A second boundary of the lens 100 may be defined by a spherical refracting surface 110 disposed in the path of light rays emitted from the source, centered on and normal to the optical axis and positioned there along so that the light rays emerging from the lens 100 within a predetermined angle—the aforementioned half angle α—with respect to the optical axis 102. The spherical refracting surface 110 is concave in the forward direction. The radius of the surface 110 in the illustrative embodiment is 17.0 mm relative to a point forward of the surface 110 along the optical axis 102 and its outer perimeter intersects the outer perimeter of the aspherical reflecting surface 108 at a radius of 9.36 mm from the optical axis in the illustrated embodiment. The outer perimeter of the surface 110 is defined at a distance of 11.65 mm forward of the plane normal to the optical axis at the rear-most boundary edge 114 of the lens 100. The spherical refracting surface 110 may further include a plurality of N concentric, ring-like annular surfaces 120, each annular surface having a cross section that is convex in the forward direction and disposed substantially at uniform radial intervals between the optical axis and the intersection with the aspherical reflecting surface. The purpose of the N concentric annular rings 120 is to provide correction for corona that appears just outside the principle beam pattern illustrated in FIG. 3. This "Gaussian" correction minimizes the corona and improves the uniformity of the distribution of light within the composite beam cross section provided by the PLD 10. The number and dimensions of the annular rings 120 are determined empirically for a given application. The cross section of each of the annular rings 120 may be substantially hemispherical. In the illustrated embodiment, centered along the optical axis and within the smallest diameter annular ring, a fragment of a hemispherical surface 122 may be provided to adjust the beam pattern falling on a distant object. At least N=3 annular surfaces have been found to be a suitable number, with N=7 to be preferable, as shown in FIG. 3, for the target distances of three to four meters.

A third boundary of the lens 100 may be defined by a hollow cylindrical surface 112 having a longitudinal axis coincident with the optical axis 102, disposed within the aspherical reflecting surface 108, and extending in the forward direction 102 from a plane normal to and intersecting the optical axis 102 approximately at the rear-most boundary edge 114 of the lens 100. The cylindrical surface 112 also defines a hollow interior space 130 that extends to a distance 116 of approximately 5.15 mm from the plane normal to the rear-most boundary edge 114. As will be described herein below, the boundary edge 114 serves as a seat against which a light emitting assembly makes contact with the lens 100. Further, the distance 116 is defined by the circumferential point around the radius of the cylindrical surface 112 that also lies on the surface of a reference cone having the same diameter at that point as the cylindrical surface 112 and an apex at the focal point 106. It is along this circumferential point that an aspherical refracting surface 118 (to be described) intersects the cylindrical surface 112. This distance of this circumferential line of intersection (between the cylindrical 112 and aspherical refracting 118 surfaces) from the normal plane 114 is determined by a "critical angle" (shown in FIG. 4C) defined as one-half of the included angle (i.e., the beam width angle β) of the reference cone.

The critical angle α, in the context of the present discussion, refers to the included angle of light emission from a light source located at the focal point 106 within which the emitted light would not be reflected by the aspherical reflecting surface 108. The critical angle α is equivalent to the half angle of the beam of light that emerges from the lens 100, and corresponds to an optimum beam cross section that, when merged with identical beams from a specified number of like light emitting sources arranged in a closely-spaced array, provides the brightest, most uniformly illuminated pattern of projected light. The critical angle α for producing a high-brightness, uniform projected beam is an empirically determined function of the number of light emitters and the characteristics of the lens elements used for the emitters. Generally, high brightness is achieved with multiple light emitting devices arranged to project overlapping individual beams of light on the target surface. The critical angle α can be thought of as an angle of disposition that defines the beam cross sections of the individual lenses for the light emitting devices, and may be different for each lens when the number of light emitting devices used in a particular array is different. The number of light emitting devices used in a particular array depends on various factors such as product packaging, available power, heat dissipation, the target distance, manufacturing costs, etc.

A fourth boundary of the lens 100 may be defined by an aspherical refracting surface 118 disposed in the path of light rays emitted from the source and centered on and normal to the optical axis. Further, the surface 118 is positioned along the optical axis 102 so that light rays emerging from the light source located at the focal point 106 and within the critical angle α with respect to the optical axis 102 are properly directed by the spherical refracting surface 110 to emerge from the lens 100 within the required half angle to produce the desired beam width angle β. In the illustrated embodiment the aspherical refracting surface 118 is a parabola concave in the forward direction and its outer perimeter intersects the outer perimeter of the cylindrical surface 112 at a boundary equidistant from the optical axis and at an appropriate linear distance along the optical axis 102 that is defined by the critical angle α.

It should be appreciated that the combination of the four kinds of concentric surfaces 108, 110, 112, and 118 described herein above—all surfaces of revolution about the optical axis 102 form and define the outer surface, i.e., the physical boundaries, of the lens 100. It will also be apparent that the four lens surfaces are maintained in a fixed relationship with each other in all copies of the lens 100 because of the solid body construction of the lens 100. This construction provides ruggedness, repeatability, and is amenable to the use of simple manufacture and assembly processes as will be appreciated by persons skilled in the art. Other features of the lens 100 include a circumferential ridge 124 surrounding the perimeter 128 of the lens 100. The ridge 124 includes a forward face 126 for use as a mounting surface. The mounting of the lens 100 will be further described with FIG. 8B. The hollow space 130 within the cylindrical surface 112 provides space for certain structural elements of the light emitting device to be described herein below.

The fifth kind of surface at the boundaries of the lens 100 is the compound surface profile resulting from the combination of the spherical refracting surface 110 and the series of annular rings 120 as shown in FIGS. 4A and 4B.

Referring to FIG. 4B, there is illustrated an enlarged cross section of a portion of FIG. 4A to show details thereof. A portion of the spherical refracting surface 110 is shown, having superimposed thereon the partially hemispherical cross section of three adjacent annular ring surfaces 120. The illustration in FIG. 4B clearly shows the radial separation between adjacent annular ring surfaces 120. In the illustrated embodiment, the spherical refracting surface 110 has a radius of 17.0 mm relative to a point along the optical axis 102 forward of the lens 100. Each annular ring 120, spaced at 1.338 mm intervals, has a cross section radius of 1.60 mm. The flat portion of the spherical refracting surface 110 between each annular ring 120 is approximately 0.25 mm.

Figure 4C:
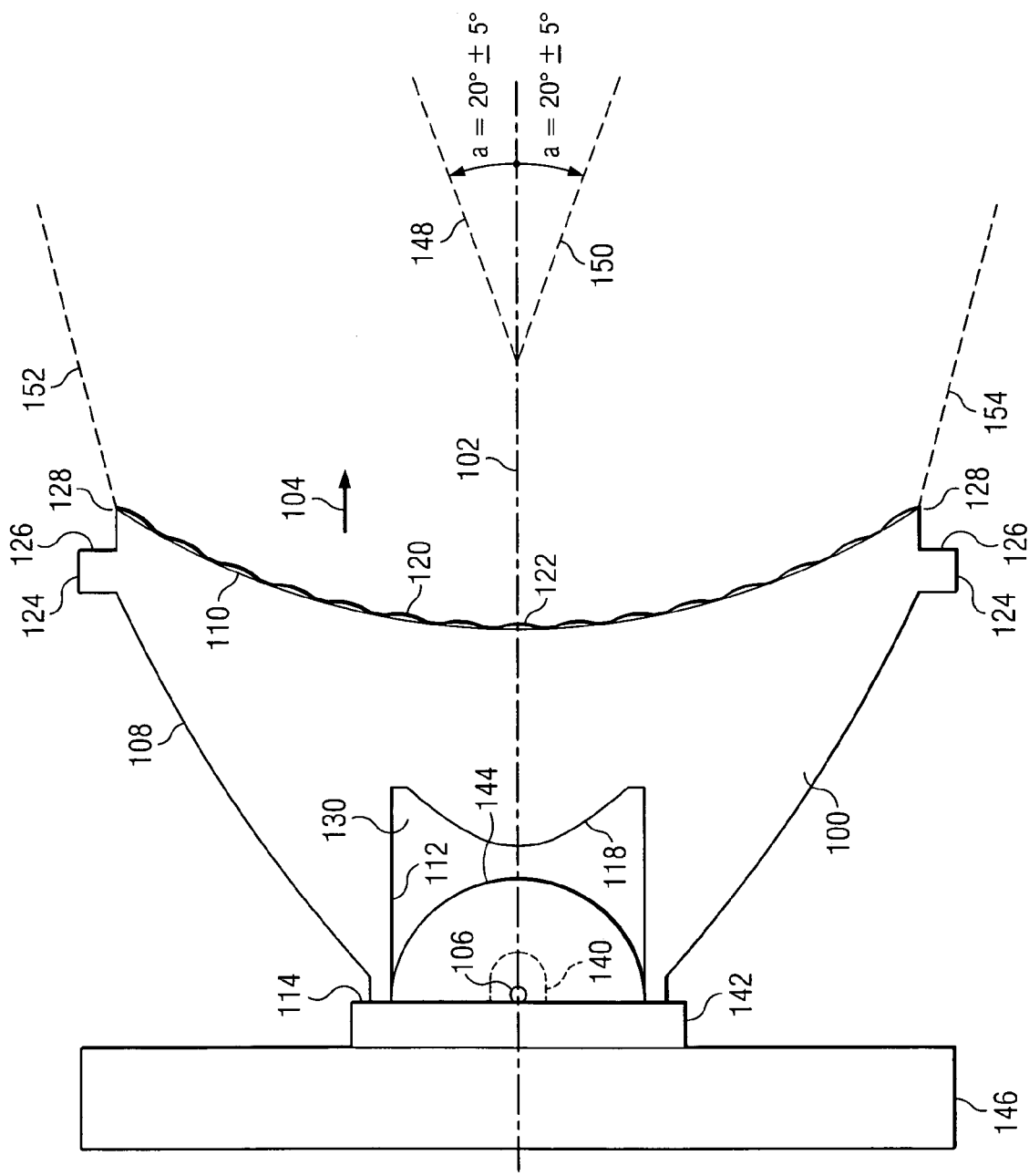
FIG. 4C illustrates a cross section profile of the solid body lens of FIG. 4A in assembly with a light emitting device assembly.

Referring to FIG. 4C, there is illustrated a cross section profile of the solid body lens 100 of FIG. 4A in combination with a light emitting device assembly 139 (which may also be called LED assembly 139 or LED unit 139). The light emitting device assembly 139 includes the light emitting device 140, the base 142, the hemispherical shell 144, and the substrate 146 as will be described. The combination of the solid body lens 100 and the LED assembly 139 will be called the lens/LED assembly 155 herein below. In the description which follows, a plurality of the lens/LED assemblies 155 will appear in some figures being described, but not separately identified in the figures with the reference number 155 to avoid confusion with the structures being described and their relationship with each other. Structures shown in FIG. 4C having the same reference numbers used in FIGS. 4A and 4B are identical. FIG. 4C thus includes a light emitting device 140 (shown in phantom) mounted on a base 142. The light emitting device 140 is enclosed within a transparent hemispherical shell 144 mounted on the base 142 such that the center of the hemispherical shell is coincident with the emitting point of the light emitting device 140. The base 142 is in turn mounted on a substrate 146. The base 142 and the hemispherical shell 144 are typically integral parts of the semiconductor package containing the light emitting device 140 (in this case a light emitting diode). The substrate 146 may be a printed circuit board. In the illustrative embodiment the substrate 146 is a laminated structure of a printed circuit and an aluminum base layer that acts as a heat sink. One suitable LED assembly 139 is a Luxeon® type LXHL-PW01 white, Lambertian emitter available from the Lumileds Lighting, Inc., San Jose, Calif., USA. This emitter is also available as an assembly (including the emitter, base, substrate, and hemispherical shell) as a Luxeon® type LXHL-MW1D "Star Base" with the white, Lambertian emitter. The "Star Base" configuration corresponds to the LED assembly 139 described herein. In alternative embodiments, the LED 140 in the LED assembly 139 may be an incandescent light emitting bulb, a gas discharge light emitting unit, an arc discharge light emitting unit, a halogen light emitting bulb, a fluorescent light emitting unit, an organic light emitting unit or a light emitting unit that emits light through any physical mechanism when initiated or driven by an electrical power source.

The light emitting device assembly 139 or LED unit 139 is typically available as a preassembled LED unit 139 from the manufacturer, assembled at the factory in planar arrays on a single printed circuit substrate for shipment to the customer. The customer need only separate or 'break off' a small section of the planar array, for example, a strip of four LED units 139, for assembly into products that employ an LED unit 139. In other applications, individual LED units 139 may be separated for installation in a product. An example of the latter is the illustrated embodiment (See, for example, FIG. 8D infra) wherein each LED unit 139 in an array of a plurality of LED units 139 is installed in a recessed area having a different angular orientation than the other LED units 139 in the array.

Returning to the description of the lens/LED assembly 155 of FIG. 4C, when assembled together with the lens 100, the transparent hemispherical shell 144 fits within the inside diameter of the cylindrical surface 112. The base 142 of the light emitting device 140 is placed against the rear-most edge 114 of the lens 100. This places the light emitting device (LED) 140 approximately at the focal point 106 of the aspherical reflecting surface 108, in the correct position for light emitted from the LED 140 to be formed by the lens 100 into the beam of light having the characteristics previously described. It will be appreciated that the transparent hemispherical shell 144, since its center is coincident with the point of emission of the light from the LED 140, passes the emitted light substantially without reflection or refraction into the space 130 bounded by the cylindrical surface 112 and the aspherical refracting surface 118. Light emitted within the critical angle $\alpha$ passes through the aspherical refracting surface 118. Light emitted outside the critical angle $\alpha$ passes through the cylindrical surface 112 or is reflected toward the aspherical refracting surface 118. The critical angle is shown in FIG. 4C as the angle $\alpha$ between the optical axis 102 and the dashed lines 148 and 150. In the preferred embodiment, the critical angle $\alpha$, which is equivalent to the half angle of the beam width, is 20°+/−5°, and the beam width $\beta$ is equal to twice the critical angle $\alpha$ or 40°+/−10°. Light passing through the cylindrical surface 112 will thus be reflected by the aspherical reflecting surface 108 before being refracted by the spherical refracting surface 110 as it exits the lens 100. The dashed boundary lines 152 and 154 define the nominal boundary of the beam of light emitted by the lens 100. The boundary lines 152 and 154 of the light beam are parallel to the lines 148 and 150 illustrating the critical angle $\alpha$.

To summarize several of the features of the optical system of the illustrative embodiment of the present invention, a unitary lens and light emitting device combination (lens/LED assembly 155) is provided that produces a highly uniform beam of light, corrected for distortions and gaps in illumination, throughout a full beam width angle $\beta$ in the range of 40°+/−10°. This lens/LED combination or light source unit is illustrated herein to demonstrate its use in arrays of such light source units to provide optimum flood illumination from a portable, hand held task lamp product. The unitary lens may be formed as a solid body plastic lens which incorporates all of the necessary optical surfaces in a single piece unit, including the pattern-correcting spherical refracting surface, concave in the forward direction of illumination, that smooths out intensity variations in the overall illumination pattern. The light source unit provided by this lens/LED combination may be used singly or arranged in many different arrays formed of a plurality of such light source units for use in a wide variety of applications.

Figure 5:
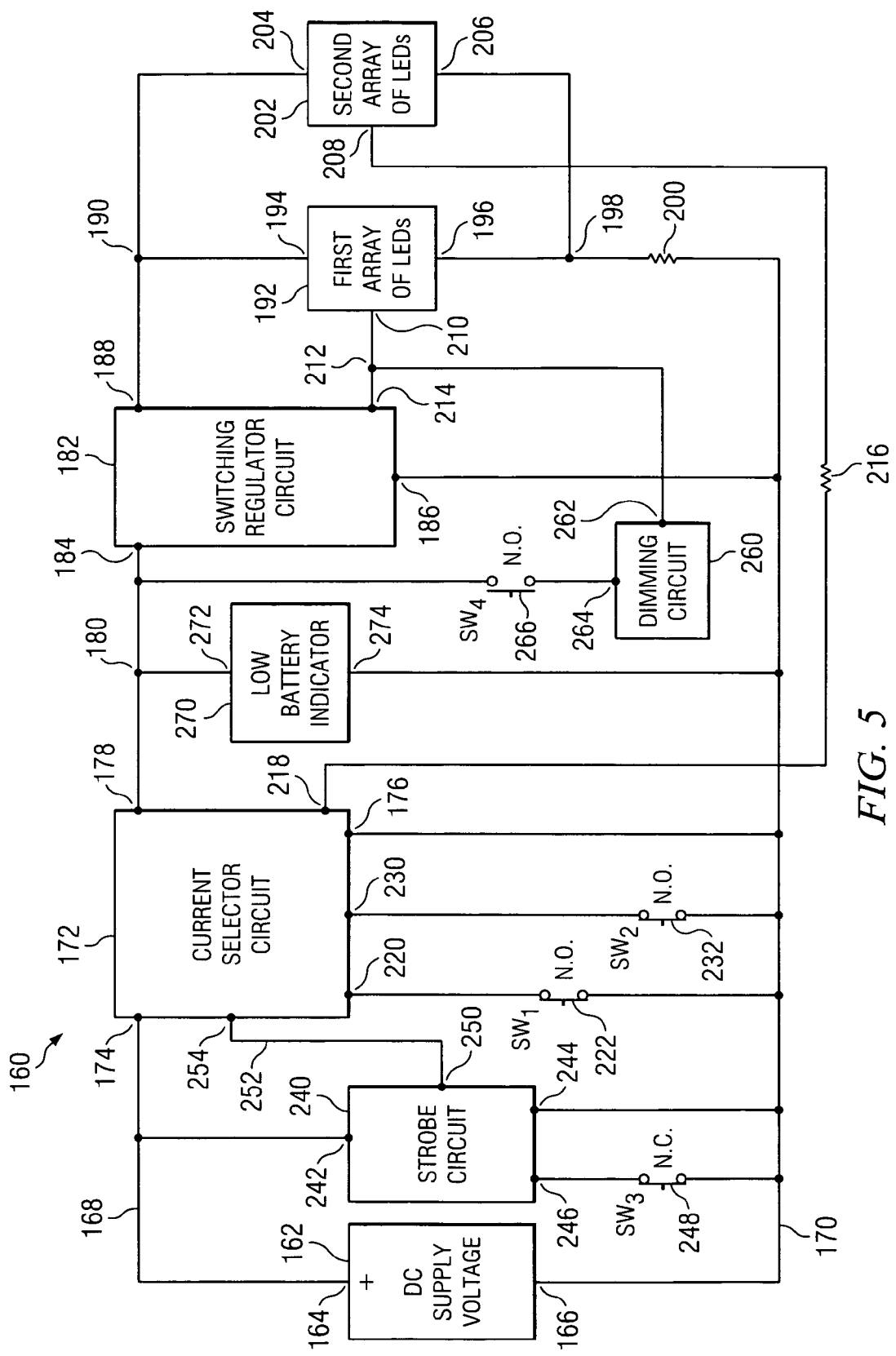
FIG. 5 illustrates a block diagram of an electrical circuit for use in the embodiment of FIG. 1 for powering and controlling the light outputs thereof.

Referring to FIG. 5, there is illustrated a block diagram of an electrical circuit 160 for use in the embodiment of FIG. 1 for powering and controlling the light outputs thereof. The purpose of the circuit is to drive two different arrays of LEDs, the first array and the second array, each at a constant brightness, from a single drive circuit. Driving each of the arrays at a constant brightness from the single drive circuit requires providing a constant current to the respective arrays, which may require different current levels to provide the specified brightness for the particular illumination pattern. The current levels are independently regulated for each array of LEDs by the electrical circuit. Further, the array of LEDs to be utilized is selected by operation of switches in the circuit by the user. The first array in the illustrated embodiment includes a plurality of LEDs and provides a flood light illumination. The second array in the embodiment example includes at least one LED and provides a spotlight illumination. The basic circuit includes a DC supply voltage 162, a current selector circuit 172, a switching regulator circuit 182, and first 192 and second 202 arrays of light emitting devices (LEDs). Optional circuits, which will be described separately, include a strobe circuit 240, a dimming circuit 260, and a low battery indicator 270.

The DC power supply 162 includes a positive terminal 164 and a negative terminal 166. The positive terminal 164 is connected to a positive supply voltage bus 168, which may also be called a supply bus 168 herein. The negative terminal 166 is connected to a negative supply voltage bus 170, which may also be called a common bus 170 herein. In the illustrative embodiment, three rechargeable, 1.2 Volt, "D" cell, nickel-metal-hydride (NiMH) cells are utilized to provide the DC power supply for the PLD 10. The current selector circuit 172 includes an input terminal 174, a common terminal 176, and an output terminal 178. The input terminal 174 is connected to the supply bus 168 and the common terminal 176 is connected to the common bus 170. The switching regulator circuit 182 includes an input terminal 184, a common terminal 186, and an output terminal 188. The input terminal 182 is connected to the output terminal 178 of the current selector circuit 172 through a node 180. The common terminal 186 of the switching regulator circuit 182 is connected to the common bus 170.

Continuing with FIG. 5, the first array of LEDs 192 includes a positive terminal 194 and a negative terminal 196. The positive terminal 194 is connected to the output terminal 188 of the switching regulator 182 through a node 190. The negative terminal 196 of the first array of LEDs 192 is connected though a node 198 and a series current sense resistor 200 to the common bus 170. The second array of LEDs 202 includes a positive terminal 204 and a negative terminal 206. The positive terminal 204 is connected to the output terminal 188 of the switching regulator 182 through the node 190. The negative terminal 206 of the second array of LEDs 202 is connected though the node 198 and the series current sense resistor 200 to the common bus 170. The current sense resistor 200 may also be called a common current sense resistor 200. The sense resistor 200 may also be called a common current sense device 200 herein because, in some embodiments, the resistor may be replaced by other elements such as an active circuit.

Working backwards through the basic circuit just assembled, a few other details will be described. The second array of LEDs 202 includes an input terminal 208, which is connected through a series resistor 216 to a drive output 218 of the current selector circuit 172. The signal coupled from the drive output 218 is a control signal to be described infra. The first array of LEDs 192 also includes an output terminal 210, which is connected through a node 212 to a sense input 214 of the switching regulator circuit 182. The current selector circuit 172 includes a first control terminal 220 and a second control terminal 230. Connected between the first control terminal 220 and the common bus 170 is a first SPST switch 222. Connected between the second control terminal 230 and the common bus 170 is a second SPST switch 232.

The first 222 and second 232 switches respectively provide ON/OFF control of the first 192 and second 202 arrays of LEDs. Both switches 222 and 232 may preferably be single pole, single throw (SPST), normally open (N.O.) switches. In FIG. 5 (and also in FIG. 6A), the symbols for the first 222 (SW1) and second 232 (SW2) are N.O. switches shown with their contacts in the closed position. This is correct as will become apparent in the description to follow. In the preferred embodiment, the first and second switches 222 and 232 are actuated with a push ON, push OFF switching action. The actuator is preferably operated by a push button. However, in other embodiments a lever, rocking button, rotating collar, or any type of actuator having a back-and-forth travel or a repeating rotational travel may be employed. Still other embodiments may employ touch-sensitive or proximity sensitive switch mechanisms requiring no moving parts. Switches having no moving parts or latching mechanisms may require a programming feature to provide the required action described herein as will be apparent to persons skilled in the art. As will become apparent in the description for FIG. 6A to follow, the first 222 and second 232 switches are operated in a non-obvious manner that provides three operating states for each SPST, N.O. switch: OFF, momentary ON, and ON.

Continuing with FIG. 5, a strobe circuit 240, which may be provided as an optional circuit to operate the first and second LED arrays of the PLD 10 in a continuous or strobed (flashing) mode, includes a positive terminal 242 connected to the supply bus 168, and a negative terminal 244 connected to the common bus 170. A switch terminal 246 on the strobe circuit 240 is coupled to the common bus 170 through a strobe switch 248 (also called SW3). The strobe switch 248 is preferably a SPST switch having normally closed (N.C.) contacts, and provides ON/OFF control to the strobe circuit 240. An output terminal 250 of the strobe circuit 240 is connected via a line 252 to an input terminal 254 of the current selector circuit 172. The strobe circuit 240 includes an oscillator which supplies a gating signal via the line 252 to control the current selector circuit 172 when activated by the strobe switch 248.

A dimming circuit 260 may be provided as an option to control the brightness of the first 192 or second 202 array of LEDs. It is available primarily as a power saving feature but may also be useful when the high brightness available from either of the LED arrays 192, 202 is not needed. An example would be when the target area to be illuminated by the PLD 10 is closer than three to four meters. The dimming circuit 260 includes a first terminal 262 and a second terminal 264. The first terminal 262 is connected to the node 212. As will be described herein below, node 212 is a connection point to the current sense circuit for the first 192 and second 202 arrays of LEDs. The second terminal 264 of the dimming circuit 260 is connected through a SPST switch 266 having N.O. contacts to the node 180. The switch 266 (also called (SW4) may be a push ON, push OFF switch for activating or deactivating the dimming circuit.

A low battery indicator circuit 270 having a positive terminal 272 and a negative terminal 274, respectively connected to the supply bus at node 180 and to the common bus 170, may be included in the illustrated embodiment of the PLD 10. The DC supply voltage 162 in the illustrated embodiment of the PLD 10 is provided by a battery pack. As will be described, the low battery indicator circuit 270 senses the voltage available at the node 180 and provides a visual indicator when the terminal voltage of the battery pack drops to a predetermined threshold.

Figure 6A:
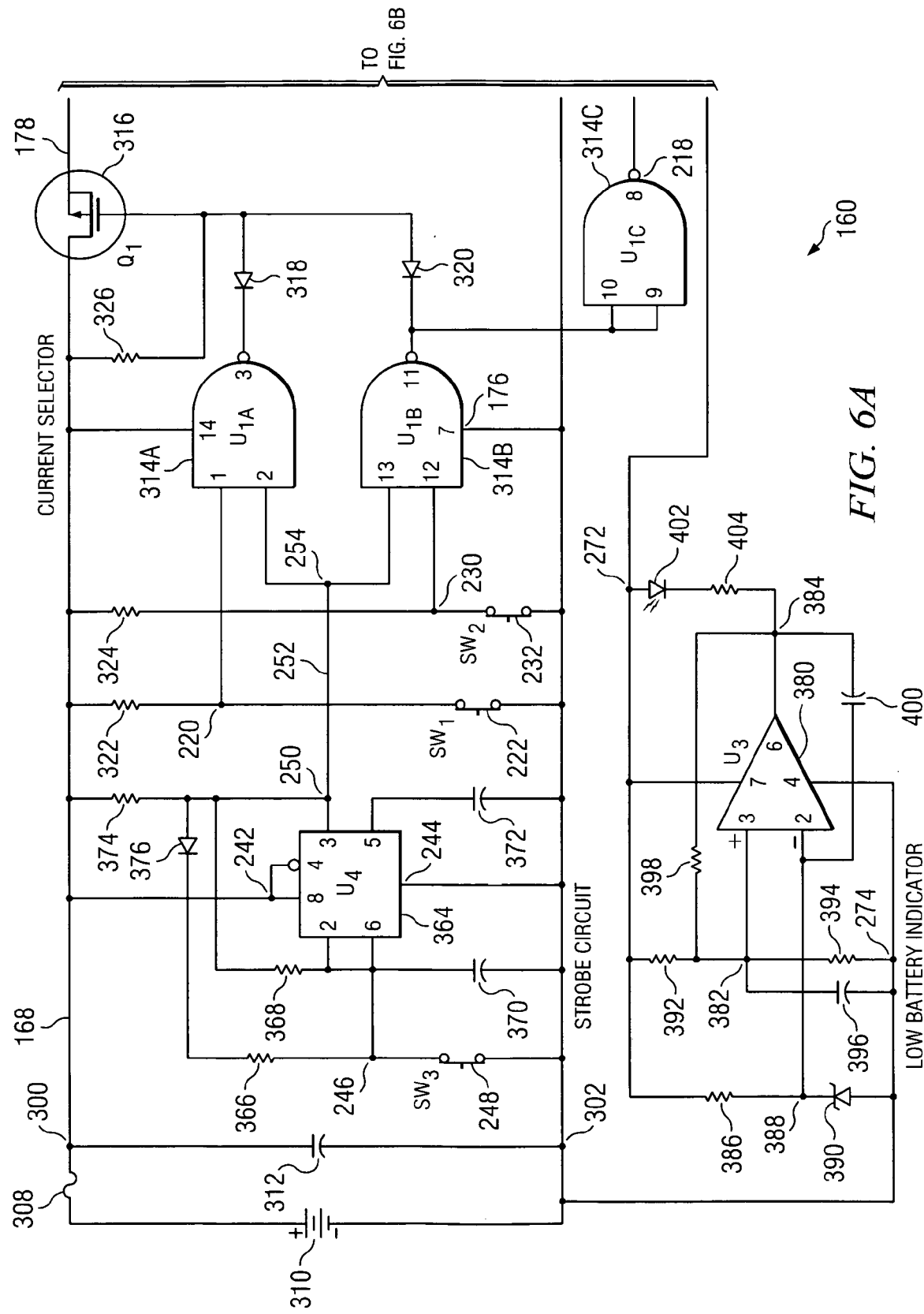
FIG. 6A illustrates a first portion of a schematic diagram of the electrical circuit of FIG. 5.

Referring to FIG. 6A, there is illustrated a first portion of a schematic diagram of the electrical circuit of FIG. 5. Some of the structural features of FIG. 6A, previously described in FIG. 5 and identical therewith, bear the same reference numbers. Other structures in FIG. 6A having a counterpart in FIG. 5 will be so identified. For example, the positive supply bus 300 in FIG. 6A is the counterpart of supply bus 168 in FIG. 5, and the common bus 302 is the counterpart of the common bus 170 in FIG. 5. Several key structures of FIG. 6A having counterparts in FIG. 5 will include the counterpart reference number in parentheses, as 300 (168), 302 (170), and so on.

Continuing with FIG. 6A, a battery 310 (162) is connected to the circuit 160, its positive terminal connected through a resettable fuse 308 to the node 300 (168) and its negative terminal connected to the node 302 (170). The node 300(168) provides the connection to the positive supply voltage bus 300(168), also known as the supply bus 300 (168). The node 302(170) provides the connection to the negative supply voltage bus 302(170), also known as the common bus 302(170). A capacitor 312 connected between the nodes 300 and 302 absorbs transients and noise from the supply 300 (168) and common 302 (170) buses. A quad NAND gate 314 (also called U1), which may be a type 74AC00SC integrated circuit, is coupled with a P-channel FET transistor 316 (also called Q1), which together function as the current selector 172 of FIG. 5. The P-channel FET 316 may be rated at 4.5 Amperes, 20 volts in the illustrated embodiment.

The quad NAND gate 314 is connected in the electrical circuit 160 as follows. As a preliminary condition, the FET 316 is connected in the supply bus 300(168) between the nodes 300 (168) and 304 (180) as follows. The drain terminal of the FET 316 is connected to the positive terminal of the battery 310 (162) via the node 300 (168). The source terminal of the FET is connected to the load side of the FET 316 at a node 304 (180). The gate terminal of FET 316 is connected to the respective anodes of first 318 and second 320 steering diodes. The cathodes of the first 318 and second 320 steering diodes are connected to output pins 3 and 11 of the first 314A and second 314B NAND gates in the quad NAND gate 314 (U1). The positive supply or Vcc terminal 14 of the quad NAND gate 314 is connected to the supply bus at node 300(168). The negative supply or Vss terminal of the quad NAND gate 314 (U1) is connected to the common bus at node 302(170).

Pins 2 (of the first NAND gate 314A (U1A)) and 13 (of the second NAND gate 314B (U1B)) are connected together at a node 254. Node 254 is connected to a node 250. Node 250 is connected to the supply bus 300 (168) through a pull up resistor 374, and also to the output pin 3 of a gated oscillator 364 (integrated circuit U4). The gated oscillator 364 is part of an optional strobe circuit to be described. Without the strobe circuit in place, the node 250 is tied to the positive supply voltage at node 300 (168) through the pull up resistor 374. The pull up resistor is provided to maintain pins 2 and 13 of the first 314A and second 314B NAND gates at a logic HIGH, unless the pins 2 and 13 are required to be driven LOW by the action of a signal applied to the node 254 to provide an auxiliary control function. Such an auxiliary control function may include a strobe function or any other function that requires interruption of current to the illumination drive circuitry that may be included in a particular embodiment. The interruption to the drive circuitry may be timed, as for providing a strobe function, or untimed, to provide a temporary OFF condition under manual control, for example. The operation of a strobe circuit, identified by reference number 240 in FIG. 5, will be described later to illustrate the control effect of signals present at node 254.

Continuing with FIG. 6A, the inputs 9 and 10 (tied together) of the third NAND gate 314C (U1C), shown configured to operate as an inverter, are coupled to the output pin 11 of the second NAND gate 314B (U1B). This arrangement provides a separate, second drive signal to control the operation of the second array 202 of LEDs. The second array 202 of LEDs is enabled to operate when selected by pressing the second ON/OFF switch 232, causing the output of the second NAND gate to go LOW and the output pin 8 of the third NAND gate 314C (U1C) to go HIGH. A HIGH output from the third NAND gate 314C (U1C) will cause a second N-channel FET 360 (Q3) to conduct, thereby causing the second array 202 of LEDs to illuminate, as will be described. As this occurs, and as will be described, the first array 192 of LEDs will not be activated even though it has been enabled by pressing the first switch 222.

The operation of the current selector 172 in FIG. 6A proceeds as follows. The first NAND gate 314A (U1A) and the second NAND gate 314B (U1B), are respectively operated by the first 222 and second 232 ON/OFF switches (SW1 and SW2) to gate ON or OFF the FET 316 that is coupled in series with the positive DC supply voltage on the supply bus 300(168). The outputs of the first 314A and second 314B NAND gates are connected via the respective steering diodes 318 and 320 to the gate of the FET 316. If the output of either the first 314A or second 314B NAND gate is a logic LOW, the FET 316 is enabled to conduct current, thus supplying operating current to the switching regulator circuit 182. As an initial condition, the input pin 2 of NAND gate 314A and pin 13 of NAND gate 314B, which are tied together at node 254, are held HIGH by the action of resistor 374 and the respective inputs, pins 1 and 12 of the NAND gates 314A and 314B are held LOW by the action of the first 222 and second 232 ON/OFF switches. (An exception to this condition, to be described infra, occurs when a strobe circuit 240 is included in the circuit and has been activated.) From this initial condition, the output pin 3 of the first NAND gate 314A switches LOW when the first ON/OFF switch 222 is pressed, opening its contacts and causing a HIGH signal at input pin 1 of U1A by the action of resistor 322. Similarly, the output pin 11 of the second NAND gate 314B switches LOW when the second ON/OFF switch 232 is pressed, opening its contacts and causing a HIGH signal at input pin 12 of U1B by the action of resistor 324. In this way, operating current for either of the first 192 or second 202 LED arrays is supplied to the switching regulator 182 by causing the FET 316 to conduct.

The foregoing operation of the first 222 and second 232 ON/OFF switches demonstrates the unusual use of the SPST, N.O., push-ON, push-OFF switches having first and second contacts to provide three operating states. The usual application of this type of switch is a first state in which the contacts are disengaged, thus disconnecting the circuit path in which the switch is used, and a second state in which the contacts are engaged, thus connecting the circuit path in which the switch is used. However, in the present invention, each of these SPST switches is sequentially operable in the first, second, and third states corresponding respectively to latched engagement of the contacts of the switch, momentary disengagement of the contacts of the switch, and latched disengagement of the first and second contacts of the switch. In this sequence, the first state (contacts engaged) operates to place the electric circuit in an OFF condition, the second state (contacts disengaged but not latched) provides activation of the electric circuit in a momentary ON condition, and the third state (contacts disengaged and latched) provides activation of the electric circuit in a latched ON condition. The first state corresponds to non-operation of the switch. Pressing the push button of the switch with less pressure than necessary to cause it to latch moves the contacts from a closed (engaged) condition to a momentarily open (disengaged) condition, which is the second state. Pressing the push button of the switch with sufficient pressure to cause it to latch moves the contacts from a closed (engaged) condition past a detent in the switch mechanism to a latched open (disengaged) condition, which is the third state. As noted previously, when the contacts are disengaged, the current selector circuit is turned ON to supply current to the first or second array of LEDs depending upon which of the two ON/OFF switches was pressed. Conversely, when the contacts are engaged, the FET 316 is turned OFF, inhibiting the current supply to the first or second array of LEDs.

Before describing the operation of the switching regulator circuit 182, some characteristics of the first 192 and second 202 LED arrays need to be described. In the illustrated embodiment, semiconductor light emitting diodes are selected for the light emitting devices of the PLD 10. For the first array 192, four each white, 1 watt, Lambertian emitter, Luxeon® type LXHL-PW01 (or type LXHL-MW1D "Star-Base" as described herein above), available from Lumileds Lighting, Inc., San Jose, Calif. is suitable. Typical values for the forward current and voltage in the 1 watt device are 0.35 Amperes and 3.42 Volts respectively, corresponding to a typical light output of 25 lumens (25 lm). For the second array 202, one each white, 3 watt, Lambertian emitter, a Luxeon® III type LXHL-PW09 (or type LXHL-LW3C "Star Base"), also available from Lumileds Lighting is suitable. Typical values for the forward current and voltage in the 3 watt device are 1.0 Amperes and 3.70 Volts respectively, corresponding to a typical light output of 80 Lumens (80 lm). Thus, the operating current for the first array 192 is approximately 0.35 Amperes and the forward voltage drop is approximately 4×3.42 Volts or 13.68 Volts, resulting in an approximate power utilization of the array of 4.8 watts. Similarly, he operating current for the second array is approximately 1.0 Amperes and the forward voltage drop is approximately 3.70 Volts, resulting in an approximate power utilization of 3.70 watts.

The foregoing figures for operating currents and power levels in the illustrated embodiment are typical values that conform approximately with the manufacturer's published specifications. In the illustrative embodiment, the second array may be operated at slightly higher current, for example, 1.10 to 1.40 Amperes, to obtain power utilization in the four to five watt range to provide greater light output for the spot light array. In one exemplary unit, the current for operating the first array 192 is approximately 0.36 Amperes as regulated by the current selector circuit 172 including the quad NAND gate 314. Further, the current for operating the second 202 array is approximately 1.30 Amperes as regulated by the control circuit 330. Keeping these current and voltage drop values in mind will inform the description of the switching regulator. Persons skilled in the art will readily understand that a wide variety of lens/LED combinations (of numbers of light emitting sources and arrays of light emitting sources) and operating power levels are possible using the principles described herein. An important feature of the switching regulator described herein is that it drives two disparate loads with constant currents from a single drive circuit.

The first array 192 of LEDs is enabled whenever current is supplied to the switching regulator 182. This may occur upon the pressing of either the first 222 or the second 232 ON/OFF switch because either condition results in a LOW applied to the gate of the FET 316 in the current selector circuit 172. In the illustrated embodiment, the first array 192 of LEDs has more LEDs in series across the output of the switching regulator than the second array 202 of LEDs. The electrical circuit 160 is arranged so that the first array 192 of LEDs will be activated by the output of the switching regulator circuit 182 unless the second array 202 of LEDs is activated. This result occurs because the voltage drop across the fewer devices in the second array 202 of LEDs is less than the voltage drop across the greater number of devices in the first array 192. If the second array 202 is activated there will be insufficient voltage from the constant current switching regulator circuit 182 to activate the first array 192 of LEDs and the LEDs of the first array 192 will be in an OFF condition. To look at it another way, when the second array 202 of LEDs is activated, it shunts current away from the first array 192 of LEDs. The PLD 10 as described herein takes advantage of this configuration as follows. The circuit of the current selector 172 includes a third NAND gate 314C (U1C) that responds to the operation of the second switch 232 by causing a LOW signal to be present at the output pin 11 of the second NAND gate 314B (U1B). As a result, the output of the third NAND gate 314C goes HIGH to enable the second array 202 of LEDs.

Figure 6B:
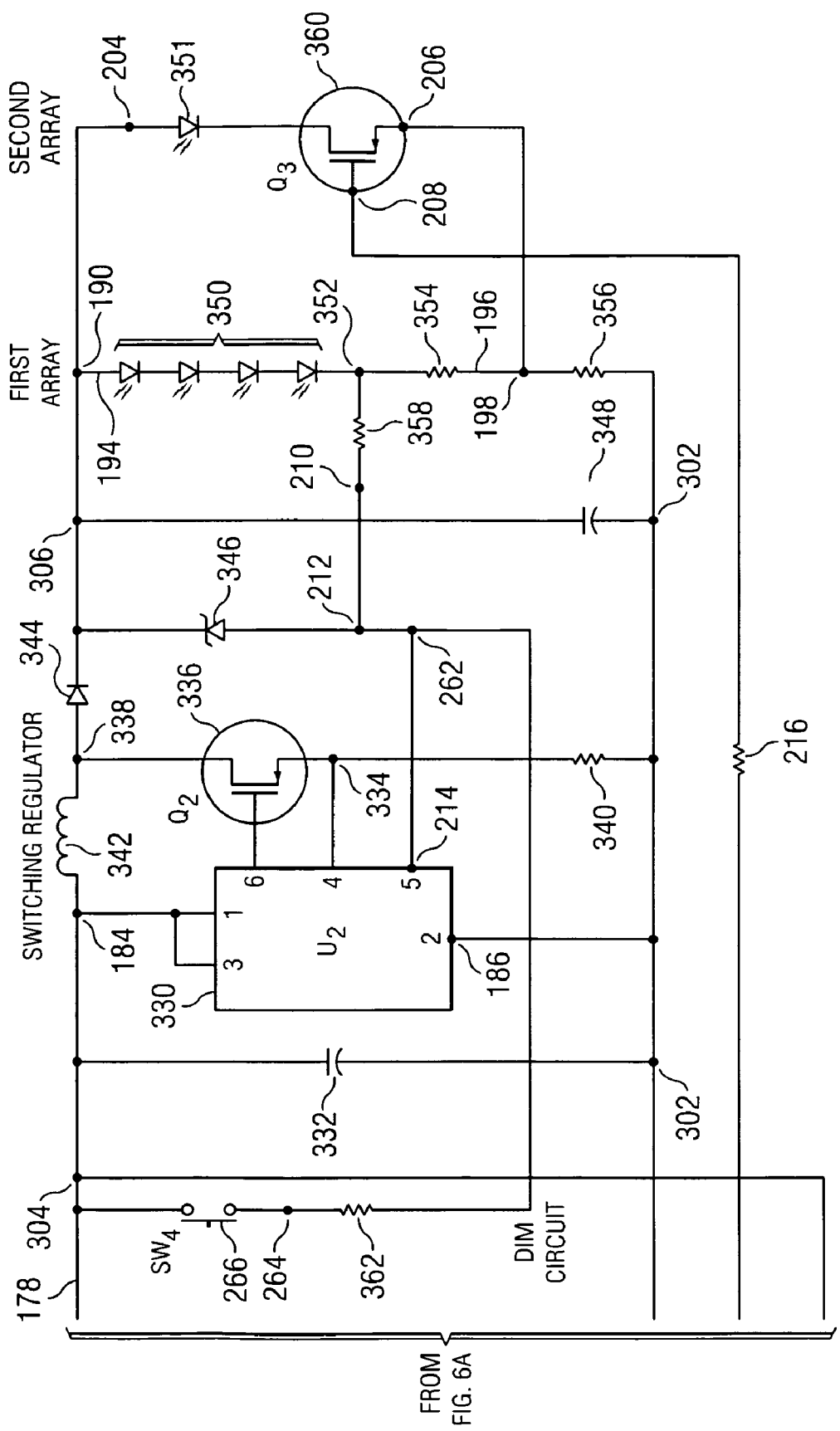
FIG. 6B illustrates a second portion of the schematic diagram of the electrical circuit of FIG. 5.

Referring to FIG. 6B, there is illustrated a second portion of the schematic diagram of the electrical circuit 160 of FIG. 5. FIG. 6B includes the switching regulator circuit 182, the first array 192 of LEDs and the second array 202 of LEDs. Some of the structural features of FIG. 6B, previously described in FIG. 5 and identical therewith, bear the same reference numbers. As with FIG. 6A, several of the structures in FIG. 6B having a counterpart in FIG. 5 will be so identified. The switching regulator circuit 182 of the illustrated embodiment is provided by a step-up flyback converter architecture that includes an integrated control circuit 330 (U2) having a positive Vcc terminal pin 1 coupled to the supply bus at node 184 and a ground terminal pin 2 (node 182) connected to the common bus 302 (170).

An inductor 342, 6.8 microHenry (uHy) in the illustrated embodiment, is connected in series between the node 184 and a node 336. A 3 Ampere, 100 volt, fast switching diode 344, is connected between the node 336 and a node 306. The inductor 342 and the switching diode 344 are connected in series with the voltage supply bus 178 at the output of the current selector 172. A 47 microFarad (uF), 25 volt filter capacitor 348 is connected between the node 306 (188) and the common bus at node 302 (170), effectively the output terminals of the switching regulator 182. Capacitor 348 is used if it is desired to drive the first 192 or second 202 arrays of LEDs with a DC voltage. However, the circuit may be operated without the capacitor 348. Without capacitor 348, the switching regulator provides a pulsed drive to the arrays 192, 202 of LEDs. The duty cycle at maximum available voltage is approximately 50%; the duty cycle when operating at minimum voltage is approximately 90%, at the operating frequency of approximately 100 Khz.

Connected between the node 336 and the common bus node 302 (170) is a first switching transistor, N-channel FET 334 (Q2), rated at 14 Amperes, 50 volts. The drain terminal of the FET 334 is connected to the node 336 and the source terminal of the FET 334 is connected to the common bus 302 (170) through a very small-valued (0.0075 Ohms in the present embodiment) series resistor 340. The source terminal of the FET 334 is also connected to pin 4 (a current sense terminal) of the integrated control circuit 330. The gate terminal of the FET is connected to pin 6 (the drive voltage output terminal) of the integrated control circuit 334. Pin 5 (a voltage feedback terminal) of the integrated control circuit 334 will be described later. The integrated control circuit 334 may be, for example, a "regulated, voltage mode converter," type ZXSC400 available from Zetex Inc., Hauppauge, N.Y. 11788. The ZXSC400 provides a programmable constant current output for driving an array of LEDs such as one or more light emitting diodes. In embodiments of the PLD 10 using other types of LEDs, the switching regulator circuit 182 may be changed to match or adapt to the particular characteristics of the LEDs.

The switching regulator 182 in the embodiment illustrated herein operates as follows. When power is first applied to the control circuit 330, the drive signal at the output pin 6 appears at the gate of the first FET 334, turning the FET 334ON. Current ramps up through the inductor 342, the FET 334, and the series resistor 340, charging the inductor 342 until the voltage across the resistor 340 reaches 30 millivolts (mV). At that point, the FET is biased OFF and the flyback action of the inductor 342 dumps the energy stored in its magnetic field as a current through the fast switching diode 344, charging the filter capacitor 348 to the peak value of the voltage available at the node 306 (188). This voltage is available to drive the first 192 and second 202 arrays of LEDs according to whether the first 222 or the second 232 ON/OFF switch is activated. Meanwhile, the circuitry within the control circuit 330 and connected to the feedback pin 5 monitors the voltage present at pin 5. Whenever the voltage at pin 5 exceeds 300 mV, the FET 334 will be gated OFF for approximately 2.0 microseconds (2.0 usec). After this time period expires, and the voltage at pin 5 falls below the 300 mV value, the FET 334 will be gated ON again. This sequence is repeated, which stabilizes the voltage at pin 5 of the control circuit 330 at the 300 mV level and the current delivered to the first 192 or second 202 array of LEDs is maintained at a constant level determined by the value of the inductor 342 and the resistor values selected for the current sensing network comprising the resistors 354 and 356.

The first 192 and the second 202 arrays of LEDs, along with the current sensing network will now be described before completing the description of the operation of the switching regulator circuit 182 when performing its current regulating functions. The first array 192 of LEDs in the illustrative embodiment is a series circuit connected between a node 190 and the common bus at the node 302 (170). The series circuit includes a string 350 of four light emitting diodes of like characteristics connected to be forward biased between the node 190 and a node 352. The anodes of the string 350 of the light emitting diodes are all oriented toward the node 190 and the cathodes are oriented toward the node 352. A lead or terminal 194 connects the anode of the uppermost light emitting diode to the node 190. A current sense resistor 354 is connected between the node 352 and through a terminal 196 to a node 198. A common current sense resistor 356 is connected between the node 198 and the common bus at node 302. A third sense resistor 358 is connected between the node 352 and the node 210 to the node 212. The node 212 is connected to the feedback pin 5 of the control circuit 330 via the node 214.

The feedback voltage at pin 5 is developed as follows. The resistor 356 is a common current sense resistor, developing a voltage drop proportional to the currents in both the first 192 and the second 202 arrays of LEDs. A second sense resistor 354, in series with the first 192 array of LEDs and the common sense resistor 356, provides a voltage at the node 352, which is sensed at pin 5 through a resistor 358 and the nodes 210 and 212. Pin 5 of the control circuit 330 is high impedance point in the circuit; thus, resistor 358 has little effect on the current sensing during normal operation.

The dimming circuit 260 may be provided as an option to control the brightness of the first 192 or second 202 array of LEDs for saving power or limiting brightness of output illumination of the PLD 10. The dimming circuit 260 includes a first terminal 262 and a second terminal 264. The first terminal 262 is connected to the node 212. The second terminal 264 of the dimming circuit 260 is connected through a SPST switch 266 having N.O. contacts to the node 180. The switch 266 (also called (SW4) may be a push ON, push OFF switch for activating or deactivating the dimming circuit. In operation, under normal operating conditions without dimming the light output, the feedback voltage at pin 5 of the control circuit 330 is approximately 300 millivolts. Closing the contacts of the dimming switch 262 drives a current through the resistor 264, thus increasing the voltage drop across the resistor 358. this action increases the feedback voltage applied to pin 5 of the control circuit 330 sufficiently to reduce the current drive to the respective first 192 or second 202 LED array to cause the brightness level to decrease by approximately 50%.

The strobe circuit 240 of FIG. 5, shown in greater detail in FIG. 6A, provides for operating the first 192 or second 202 arrays of LEDs in an alternating ON and OFF mode—i.e., flashing—at a fixed duty cycle and frequency. The timing provided is approximately 0.25 seconds ON and 1.0 second OFF. The heart of the strobe circuit 240 is a 555 timer circuit 364 operated as a gated oscillator. The timer circuit 364 is an 8-pin integrated circuit that includes a Vcc terminal 242 (pin 8, which is tied to pin 4) connected to the supply bus 300 (168) and a Vss terminal 244 (pin 1) connected to the common bus 302 (170). Pin 2 is connected through resistor 368 and resistor 374 to the supply bus 300 (168). The junction of the resistors 368 and 374 is a node 250 that is connected to pin 3 of the timing circuit 364. Pin 6 of the timing circuit 364 is connected to a node 246. Node 246 is connected through a resistor 366 to the cathode of a signal diode 376. The anode of the diode 376 is connected to the node 250. Node 246 is further connected to the common bus 302 (170) via a SPST, normally closed (N.C.) switch 248 (also called SW3 in FIG. 6A). Pin 5 of the timing circuit 364 is connected to the common bus 302 (170) via a capacitor 372 acting as a noise filter. As previously described, the node 250 is connected to the node 254, which is the signal input for controlling the current selector 172 in either a continuous or strobe mode.

The strobe circuit 240 operates as follows. When the strobe switch 248 (SW3), having N.C. contacts is in a released state, i.e., not pressed or activated, its contacts are closed and the output pin 3 of the timer circuit 364 is held HIGH by the action of the pull up resistor 374 at the node 250. This signal is applied to pins 2 and 13 of the NAND gate 314, providing the initial or quiescent condition for responding to the activation of the first 222 and second 232 ON/OFF switches during operation of the PLD 10. When the strobe switch 248 (SW3), having N.C. contacts is pressed or activated, its contacts are open, the voltage across the capacitor 370 rises until it exceeds a threshold value, and the output pin 3 of the timer circuit 364 is caused to switch to a logic LOW, removing the drive to the FET 316. At that instant, the capacitor 370 begins to discharge toward zero. When the voltage across the capacitor 370 reaches the threshold voltage at pin 2 of the timer circuit 364, the output at pin 3 of the timer circuit 364 switches back to a HIGH, causing the FET 316 to turn ON. The cycle repeats as long as the strobe switch 248 is activated. It is preferably a push ON, push OFF, latching type of switch that remains activated until it is pressed a second time after turning ON the strobe function. The timing of the cycle is set by the RC time constants of the capacitor 370 and the resistors 366 and 368. As mentioned herein above, the current selector circuit 172 is held OFF for approximately 1.0 second and ON for approximately 0.25 second when the strobe circuit is activated. This timing sequence can of course be revised by changing component values to satisfy particular preferences.

Returning to FIG. 6A, the circuit for the low battery indicator 270 of FIG. 5 will now be described. The low battery indicator 270 includes a positive terminal 272 and a negative terminal 274, respectively connected to the supply bus at node 304 in FIG. 6B (180 in FIG. 5) and to the common bus 302 (170). The DC supply voltage 162 in the illustrated embodiment of the PLD 10 is provided by a battery 310 (162). In the illustrative embodiment, three rechargeable, 1.2 Volt, "D" cell, nickel-metal-hydride (NiMH) cells are utilized to provide the DC power supply for the PLD 10. The circuit for the low battery indicator 270 senses the voltage available at the node 180 and provides a visual indicator when the terminal voltage of the battery pack 310 (162) drops to a predetermined threshold. The predetermined threshold is set to approximately 3.1 Volts, corresponding to a useful output for about one hour.

Continuing with FIG. 6A, the node 272 represents the positive supply voltage connected to the output of the current selector circuit 172. The node 272 is also the monitored point in the circuit 160 for tracking the available battery voltage. The node 274 represents the negative supply terminal connected to the common bus 302 (170). The indicator circuit utilizes an op amp 380 (also called U3) connected as a comparator. Pin 7 of the op amp is connected to the node 272 and pin 4 is connected to the node 274. The positive input pin 3 is connected to a node 382 and the negative input pin 2 is connected to a node 388. The output pin 6 is connected to node 382 through a resistor 398 to provide some positive feedback to ensure a rapid transition when the op amp comparator switches. Pin 6 is also connected to the node 388 through a capacitor 400 to roll off the gain at higher frequencies so that the comparator is less sensitive to noise. Output pin 6 is further connected to the node 272 through a light emitting diode 402 in series with a resistor 404. The positive input pin 3 tracks the DC voltage present at node 382, the center of the voltage divider formed by resistors 392 and 394 connected between the nodes 272 and 274. A capacitor 396 is connected from node 382 to node 274 to stabilize the DC voltage at node 382. Also connected between the nodes 272 and 274 is a series circuit formed by a resistor 386 and a zener diode 390. The junction of the resistor 386 and the zener diode 390 is node 388, which applies the zener reference voltage of 2.50 volts to the negative input pin 2 of the op amp 380. Thus, whenever the voltage at the node 382 drops below the reference voltage present at the node 388, the output of the op amp switches from HIGH to LOW, causing sufficient current to flow in the light emitting diode 402, indicating the low battery voltage condition.

To summarize several of the features of the electrical circuit of the illustrative embodiment of the present invention, a single drive circuit is configured to drive disparate current loads of first and second lighting arrays—combinations of compact light emitting devices—with the respective regulated constant currents. Further, a configuration of first and second standard push ON, push OFF, latching switches provides independent control of the two lighting loads wherein each switch operates in three states including momentary ON, continuous ON, and OFF. The circuit is readily adapted to providing continuous or pulsed drive to the lighting arrays. Also described are optional circuit features that provide a dimming control, a strobe control, and a low battery indicator.

Figure 7:
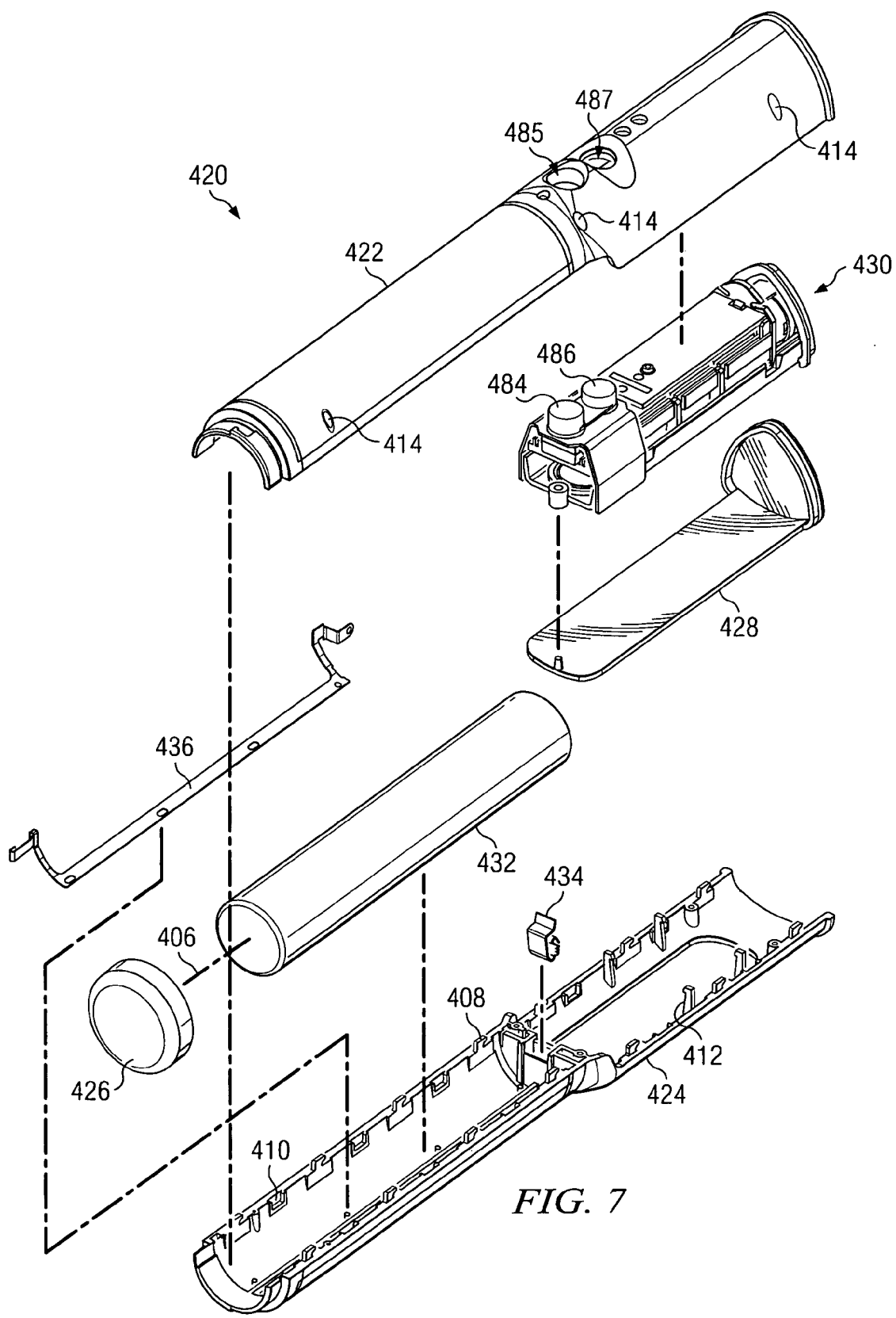
FIG. 7 illustrates an exploded view of major parts and assemblies of the embodiment of FIG. 1.

Referring to FIG. 7, there is illustrated an exploded view 420 of major parts and assemblies of the embodiment of FIG. 1. The first 422 and second 424 elongated shells, when assembled together around the contents of the PLD 10 (See FIG. 1) form an elongated tubular housing 12 (See FIG. 1) having a longitudinal axis 14 (See FIG. 1) approximately coincident with the centerline 406 of the battery pack 432. A combination of a plurality of alignment tabs 408 distributed along each side of the second elongated shell 424 are placed to fit within complementary receptacles, such as that identified by reference number 410, disposed in a plurality of corresponding locations along each side of the first elongated shell 422, thus ensuring that the first 422 and second 424 shells are securely and correctly aligned upon assembly. The first 422 and second 424 shells are typically secured together using machine screws inserted in the locations 414 and elsewhere through surfaces not visible in FIG. 7. Further, resilient prongs 412 molded near the inside edges of the second elongated shell 424 near the first section 16 (See FIG. 1) may be configured to spring into a locking relationship with corresponding ridges molded into the first elongated shell 422, to further secure the first 422 and second 424 shells together prior to inserting the machine screws at the locations 414. The alignment tabs and resilient prongs, in combination with the use of overmold gaskets applied during the manufacturing process (described two paragraphs infra), contribute to the overall strength and rigidity of the elongated housing structure. Such ruggedness is expected in a lighting product intended for the specific industrial markets listed below in the next paragraph.

The first 422 and second 424 elongated shells shown in FIG. 7 may be preferably molded or cast from thermoplastic or metallic materials. In the illustrative embodiment, a general purpose, unreinforced polyetherimide resin (PEI) sold by G. E. Plastics under the brand name ULTEM®, 1000 series, may be used because of its heat resistance, dimensional stability, durability, very high strength and resistance to chemicals. It is much lighter than aluminum or steel, and does not make metallic sounds or produce sparks when contacting other objects. These are important characteristics in a product intended for use in all kinds of weather and environmental conditions by security personnel, service truck persons, military, police, fire, EMS, and CSI units, etc., as well as aircraft and vehicle maintenance personnel.

The major components or assemblies housed within or forming part of the elongated housing include an end cap 426, a side over lens 428, an illumination module or light emitting assembly 430, the battery pack 432, a positive battery contact 434, and a negative battery contact 436. The end cap 426, molded from the same material as the elongated shells, may be threaded to permit access to the battery pack 432 for replacement. The side lens 428 (See also side lens 24 in FIG. 1) is a one-piece, transparent covering lens that extends the housing shell over the light emitting assembly 430. The side lens 428 protects the LED/lens assemblies in the flood light array and includes an extension 428A to protect the spot light array portions of the PLD 10. In standard applications the side lens 428 may be "water clear," a term denoting a high degree of colorless optical clarity. In certain applications, the side lens 428 may be colored, but preferably maintaining a high degree of optical clarity and light transmission.

The side lens 428 and its extension 428A may be molded as a single piece of a suitable thermoplastic such as polycarbonate (PC), which exhibits a suitable blend of toughness, optical clarity, stability, etc. The side lens 428 is slightly curved in the illustrative embodiment to match the slight curvature of the second housing shell 424 over the first array of LEDs in the light emitting assembly 430. The side lens extension 428A may be formed as an end cap over the end of the PLD 10 including the spot light array. Further, the polycarbonate material satisfies a requirement that the refractive index of the side lens 428 be uniform throughout the side lens 428 to minimize distortion of the light beams emitted by the light emitting assemblies. An additional feature of the side lens 428 may be a gasket portion provided during an overmolding process that is well-known to persons skilled in the art. The gasket is a band of suitable material added along the edges of the side lens 428 where the side lens 428 mates with corresponding edges in the first 422 and second 424 elongated shells of the elongated housing. The gasket is formed in a mold similar to that used to form the side lens but having a different profile for being molded during a second operation (i.e., a "second shot") before ejection of the finished part. The same technique may also be used to advantage during the molding of the first 422 and second 424 elongated shells. The overmold type of gasket ensures sealing against water and stability of the joint between the components of the elongated housing.

Continuing with FIG. 7, the light emitting assembly 430, to be described in detail with FIGS. 8A through 8D, includes a frame, a circuit board for the electrical circuit 160, the lens/LED assemblies for the first 192 and second 202 arrays of LEDs, the first 222 and second 232 ON/OFF switches, and lens bezels (to be described) in a compact, rugged, serviceable unit that is configured for ease of replacement in the field. In FIG. 7, the first 222 and second 232 ON/OFF switches are represented by the flexible sealing bezel 502 having first and second raised portions 484 and 486 respectively covering the push buttons 504 and 506 of the first 222 and second 232 ON/OFF switches. The first 484 and second 486 raised portions, when the light emitting assembly 430 is assembled in position within the first 422 and second 424 halves of the elongated housing 420, extend through the first 485 and second 487 openings in the first half 422 of the elongated housing. This arrangement of the first 222 and second 232 ON/OFF switches in the elongated housing 420 enables holding the PLD 10 in one hand with two of the fingers of the user's hand curled loosely around the body of the PLD 10 in the location of the switches 222, 232, thus permitting easy, independent operation of either switch. The positive 434 and negative 436 battery contacts are preferably formed from a beryllium copper alloy well known for its properties as used in the manufacture of springs and contacts that require high longevity for uses involving many flexing cycles.

Figure 8A:
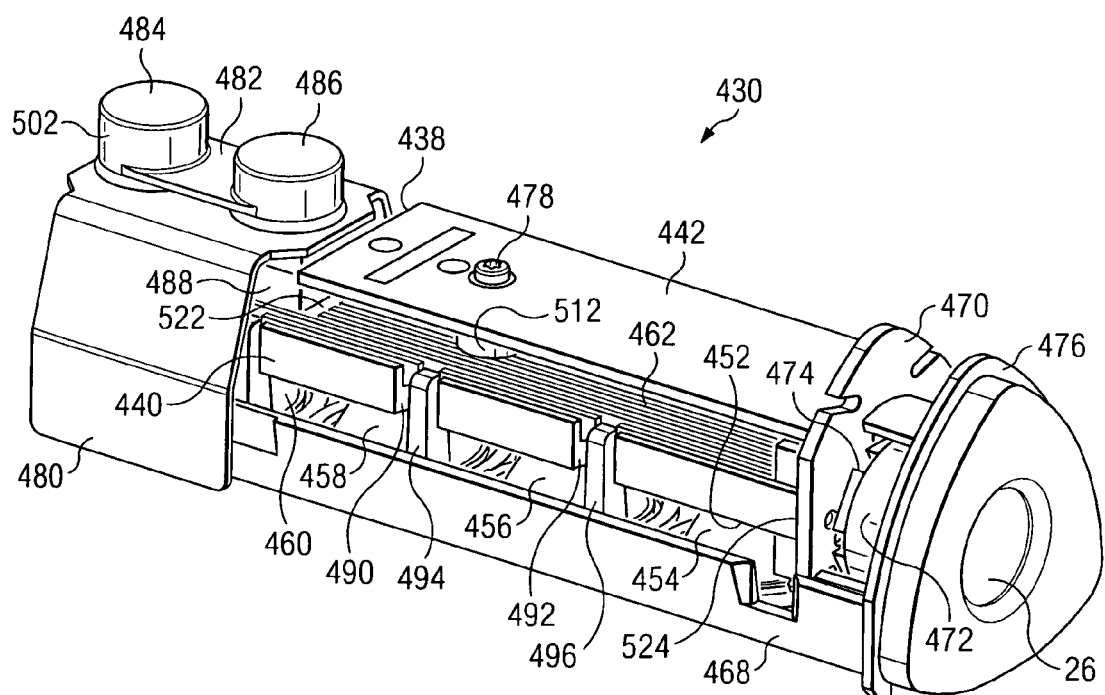
FIG. 8A illustrates a perspective view of a rearward side of a light emitting module of the embodiment of FIG. 1.

Referring to FIG. 8A, there is illustrated a perspective view of a rearward side of a light emitting module 430 for use in the embodiment of FIG. 1. The light emitting module 430 is shown in various views in FIGS. 8A, 8B and 8D. FIG. 8C to be described later illustrates an internal portion of the structure of the light emitting module 430. Reference numbers used in common in the several views identify features in the view that appear in one or more of the other views. In FIG. 8A, a heat sink 440 disposed in the middle portion of the light emitting module 430 serves as a frame having first 452 and second 462 opposite sides for the support of the other structures that comprise the light emitting module 430. In the description that follows, the terms heat sink and frame may be used interchangeably, accompanied by the same reference number 440. The heat sink 440 is preferably fabricated of aluminum or other suitable conductor of heat. Further, the heat sink 440 is configured as a low profile platform for mounting thereon one or more arrays of light source units such as the lens/LED assembly 155 (Illustrated in FIG. 4C) combinations as described herein. The lens/LED assemblies 155 as they appear in the light emitting module 430 are most clearly shown in FIG. 8C, described herein below.

Continuing with FIG. 8A, the heat sink 440 preferably includes sufficient surface area for dissipating the heat generated by the LEDs in the first 192 and second 202 arrays of LEDs and the electrical circuit 160. In the illustrated embodiment, the heat sink 440 includes a plurality of heat radiating fins 522 on the second (upward) side 462 as it appears in FIG. 8A. A heat sink extension 470 is attached to the right-hand or first end 524 (as shown in the figure) of the light emitting module 430, mounted at a right angle to the first end 524 of the frame 440. The heat sink extension 470 may be a separate part attached with screws or other fastener or it may be fabricated with the frame 440 as a single piece heat sink unit. The heat sink extension 470 is provided to dissipate heat produced by the second array 202 of LEDs when producing a spotlight beam. The heat sink extension also supports the second array 202 of LEDs in the light emitting module 430.

The heat sink or frame 440 shown in FIG. 8A further supports the printed circuit board (PC board) 442, which contains the electrical circuitry 160, adjacent the second side 462 of the heat sink or frame 440. A first end (obscured by the heat sink extension 470) of the PC board 442 is attached to the heat sink extension 470, preferably in a groove machined therein for the purpose or its equivalent. The second end 438 of the PC board 442 is supported by a spacer 512 that is positioned between the heat sink 440 and the PC board 442 and secured by a machine screw 478. The spacer 512 is located in a recess in the second side 462 of the heat sink 440 that includes the heat radiating fins 522. The PC board 442 may be supported on the frame 440 by other methods well known to persons skilled in the art or otherwise integrated into an assembly of the frame/heat sink 440 and the one or more arrays of light source units.

Mounted on the opposite side of the heat sink or frame 440 from the PC board 442 of the illustrative embodiment are the four lens/LED assemblies 155 (See FIG. 4C) of the first array 192 of LEDs. Partly visible in FIG. 8A, between the heat sink 440 and a first array bezel 468 (to be described; see also the bezel 20 in FIG. 1) are the outer sides of the lenses 454, 456, 458, and 460 for the four lens/LED assemblies 155. The first array bezel 468 is preferably a one piece molded thermoplastic component that serves as a front panel—a mask and alignment support surrounding the light-emitting side of the lenses 454, 456, 458, and 460. The first array bezel 468 also serves as a U-shaped mounting clip (when viewed in cross section) that holds the lens/LED assemblies 155 against the heat sink frame 440. Extending from both of the longer, opposite edges of the first array bezel 468 are a plurality of resilient prongs or "flex arms"—a hooked end preferably having a curled "finger" (not shown) formed in the end of each prong. Two prongs 494, 496 of the three prongs disposed on the near side of the first array bezel 468 are shown in FIG. 8A. Three such prongs 494 or 496 may be used on each side of the first array bezel 468. The space within the curled "fingers" of the end of each prong 494, 496 snaps over the proximate edge of corresponding recessed notches 490, 492 formed in the edges of the heat sink or frame 440. When installed on the frame 440, the bezel 468 traps the individual lens/LED assemblies 155 between it and the frame 440 to secure them in position.

Two other assemblies are shown in FIG. 8A. Mounted on the heat sink extension 470 is the second LED array 202 enclosed within a cannister 472. The cannister 472 acts as a holder for the lens/LED assembly 155 of the second LED array 202, positioning a heat transferring face of a printed circuit portion 474 of the lens/LED assembly 155 against the heat sink extension 470 in a correct alignment. The heat transferring face of the printed circuit portion 474 is typically an aluminum plate that is laminated to the surface of the printed circuit. The assembly of the cannister 472 and the printed circuit portion 474 of the lens/LED assembly 155 of the second array 202 is held in place by a front lens support 476 (which may also be called a second array bezel 476). The front lens support 476 has a lip that fits over a corresponding ridge formed in the first array bezel 468. Once the lip is engaged with the ridge, the front lens support 476 may be tilted toward the heat sink extension 470 until a resilient prong 540 having a hooked end 546 hooks through an edge of a hole formed in the heat sink extension 470, as shown in cross section in FIG. 8D. Also shown in FIG. 8A is the forward surface of the second LED array 202. Close observers will note that the side lens 428 and its extension 428A (Reference number 24 in FIGS. 1 and 2) are not shown in FIG. 8A. In the illustrated embodiment the clear side lens 24 and the clear top lens 28 are shown as a single part, called the side lens 428 and its extension 428A respectively in FIG. 7.

The remaining assembly of FIG. 8A includes a switch bracket 480, which encloses and aligns the first 222 and second 232 ON/OFF switches (See FIGS. 5 and 6A) in position with respect to the frame 440. The switch bracket 480 may be fabricated from, e.g., 19 gauge metal (approximately 0.042 in or 1.06 mm thick). A portion 488 of the second ON/OFF switch 232 is visible in FIG. 8A. The ON/OFF switches 222, 232 are mounted on the frame 440, the switch bracket 480 is slipped over the push button actuators 504, 506 (see FIG. 8D) of the switches 222, 232, and a flexible sealing bezel 502 (also called flexible bezel) is placed over the push button actuators of the switches 222, 232. The flexible bezel 502 has raised portions 484, 486 respectively for enclosing the push button actuators for the switches 222, 232. A link 482 couples the raised portions 484, 486 of the flexible bezel 502 together. The link 482 helps to maintain alignment of the raised portions 484, 486 upon installation within the elongated housing 420. The flexible bezel 502, which may be fabricated of neoprene or similar material, is provided to seal the ON/OFF switches 222, 232 against intrusion of moisture, dirt, and other possible contaminants encountered during use of the PLD 10. Wire leads (not shown in FIGS. 8A through 8D for clarity) may be provided for connecting the ON/OFF switches (obscured by the flexible bezel 502) to the electrical circuitry of the PC board 442.

Figure 8B:
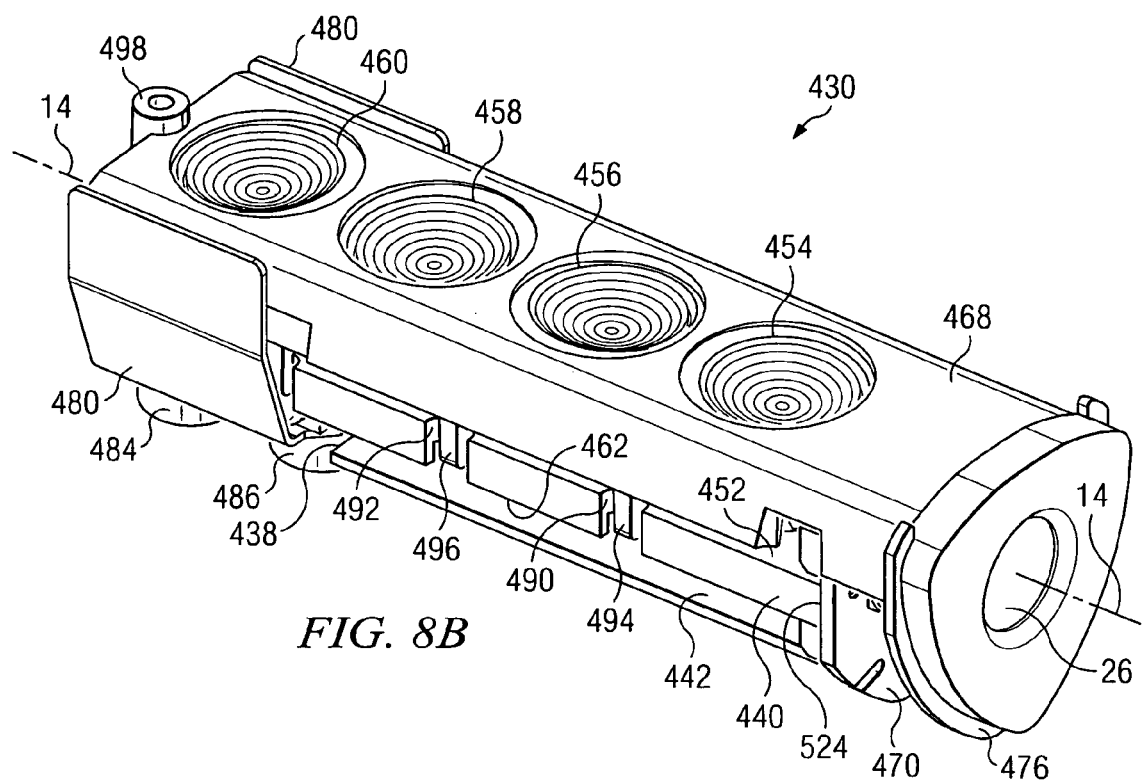
FIG. 8B illustrates a perspective view of the forward side of the light emitting module illustrated in FIG. 8A.
Figure 8C:
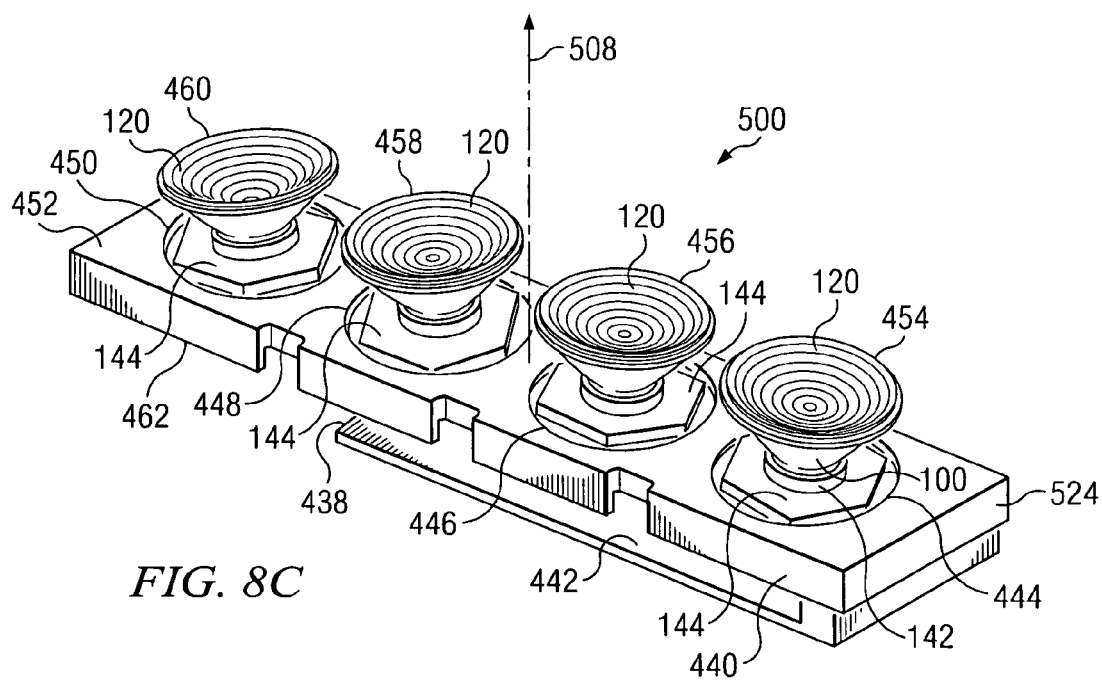
FIG. 8C illustrates a perspective view of a basic module portion of the light emitting module appearing in FIG. 8B.

Referring to FIG. 8B, there is illustrated a perspective view of the forward side of the light emitting module 430 illustrated in FIG. 8A. The forward side of the light emitting module 430 is the side that faces in the direction of light emission. For example, see FIG. 8C, which illustrates a forward axis 508 of illumination normal to the frame 440. While shown disposed in a central portion of the frame 440, the forward axis 508 may be defined at the optical axis of each light emitting assembly where it provides a reference for the angular orientation of the individual light emitting assembly (lens/LED assembly 155). As described previously with FIG. 2, and as will be described further herein below, the angular orientation of the light emitting assemblies is an aspect of one of the novel features of the present invention. While shown as defined for a frame 440 configured as a flat planar surface, where all normal reference lines are by definition parallel to each other, in other embodiments having a curved frame, the normal lines are unique to the location of each light emitting assembly. In such cases, the forward axis 508 would be a nominal axis defining the direction of illumination but not normal to all parts of the frame.

Continuing with FIG. 8B, the perspective view is similar to the view in FIG. 8A except that the light emitting module 430 has been rotated about its longitudinal axis 180°, thereby exposing the forward, light emitting side the light emitting module 430. Each of the lenses 454, 456, 458, and 460 for the four lens/LED assemblies 155 of the illustrated embodiment are shown in alignment with the first array bezel 468. Also shown are two of the resilient prongs 494, 496 extending from the first array bezel 468 that engage two corresponding notches 490, 492 in the edges of the frame/heat sink 440 to secure the lens/LED assemblies 155 against the frame 440. Four other prong/latch combinations are used (but not shown) to secure the first array bezel 468 to the frame 440 to entrap and secure the four lens/LED assemblies 155 there between. The PC board 442 is shown disposed below the frame 440, adjacent the second side 462 of the frame 440.

The partly obscured first ends of the heat sink or frame 440 and the PC board 442 are disposed toward the heat sink extension 470. The second end 438 of the PC board 442 is shown oriented to the left in the figure toward the first and second ON/OFF switches 504, 506 (not visible in FIG. 8B, but see FIG. 8D) and enclosed within the corresponding raised portions 484, 486 of the flexible bezel 502. Wire leads (not shown) for connecting the switches 504, 506 to the PC board 442 are typically routed alongside the bodies of the switches 504, 506. The switch bracket 480 is shown extending from beneath the flexible bezel 502 and upward along each side of the first array bezel 468. The front lens support 476 and the forward surface of the lens 26 of the second LED array 202 are shown attached to the right-hand end of the light emitting module 430 in FIG. 8B.

Referring to FIG. 8C, there is illustrated a perspective view of a basic module 500 of the light emitting module 430 appearing in FIG. 8B. In fact, reduced to the minimum essentials, the basic module 500 embodies many of the essential features of several aspects of the present invention. The heat sink or frame 440 is shown, having the first side 452 and the second side 462, as well as the first end 524. The PC board 442, having a second end 438, is shown just below the frame 440. Not visible in the view of FIG. 8C (But, see FIG. 8D) is the spacer 512 between the PC board 442 and the frame 440 within which the machine screw 478 passes to secure these two structures together. Also shown mounted on the first side 452 of the frame 440 are four lens/LED assemblies 155, identified respectively by their associated lenses 454, 456, 458, and 460. Each assembly occupies a respective recess 444, 446, 448, and 450 machined into the first side 452 of the frame 440. The bottom surface of each of the recesses 444, 446, 448, and 450 is machined at an angle relative to the normal axis 508 that is somewhat less than 90° so that the optical axis of the lens/LED assembly 155 installed therein is tilted in a predetermined direction by the amount of the previously described angle θ.

Each lens/LED assembly 155 shown in FIG. 8C includes its lens 454, 456, 458, and 460 (each lens being configured like the lens 100 in FIGS. 4A, 4B, and 4C). Thus, each of the lens/LED assemblies 155 of FIG. 8C includes a base 142, a substrate 144, and the concave light emitting surface 110 of the lens 100 having the plurality of concentric annular rings 120 formed thereon as in the FIGS. 4A, 4B, and 4C. Close observation of the placement of the individual lens/LED assemblies 155 reveals that each is canted at substantially the same (generally small) angle θ with respect to the normal axis of each lens/LED assembly 155 but in a different azimuthal direction with respect to the frame 440 and its normal or forward axis 508 (See FIG. 8D). This relationship will be described in detail with FIG. 8D to follow.

The basic module 500 illustrated in FIG. 8C is constructed as a rugged assembly of the essential components of the light emitting module 430. All of the components are solid structures fabricated of solid materials that are very resistant to breakage, particularly when secured in place by the front bezel 468 and installed within the elongated housing 12 as shown in FIG. 7. The elongated housing is also constructed of materials highly resistant to damage from impact and other mechanical hazards, as well as extreme environmental, chemical, and electrical conditions. When assembled together, the components of the PLD 10 as described herein are designed to withstand heavy use and abusive handling as is often encountered in industrial, security, military, and public safety applications. Other techniques or modifications such as use of silicone sealants, potting compounds, and the like may be used to provide enhanced protection from the effects of moisture intrusion or contact with harsh chemical or environmental conditions.

Figure 8D:
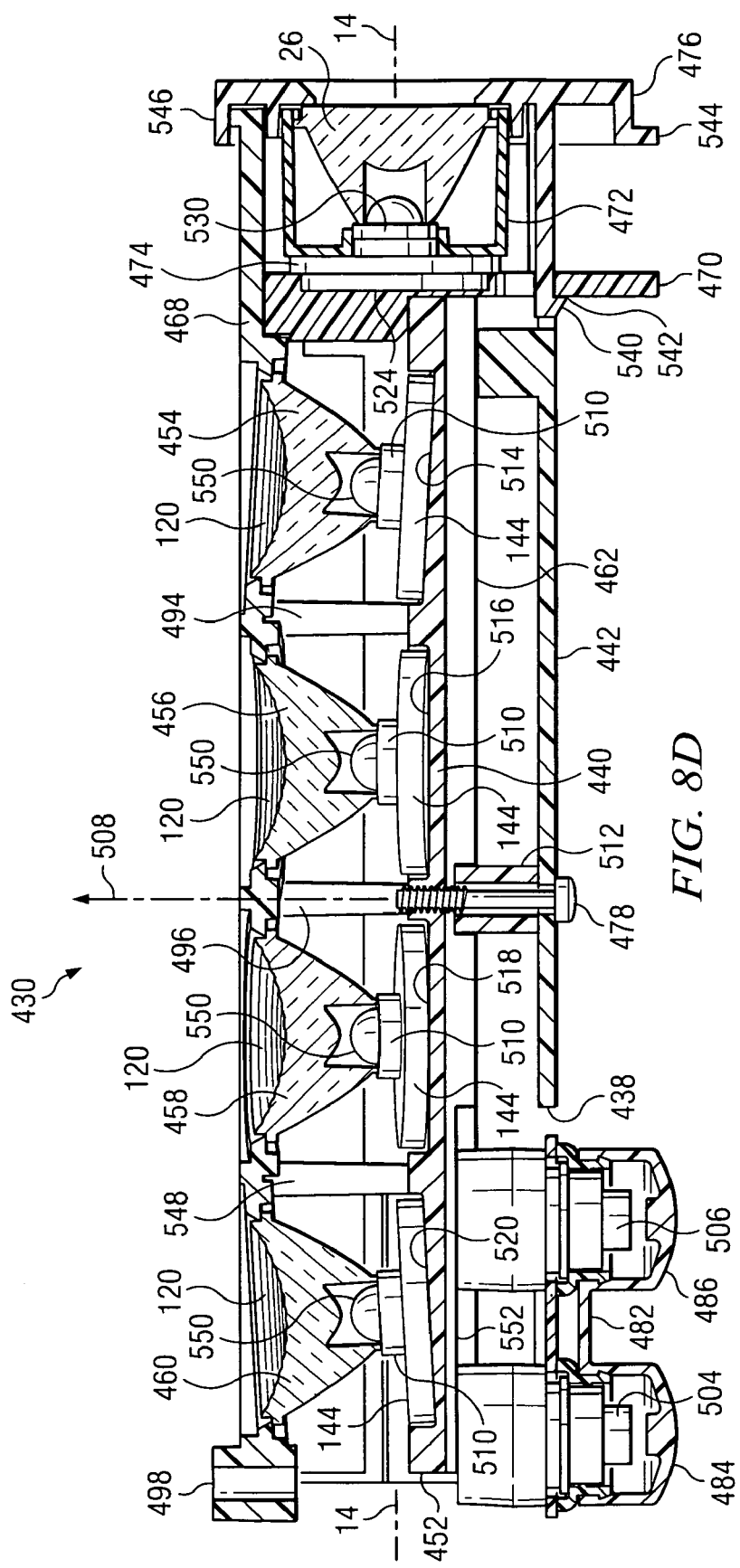
FIG. 8D illustrates a side cross section view of the light emitting module of the embodiment of FIGS. 8A and 8B.

Referring to FIG. 8D, there is illustrated a side cross section view of the light emitting module 430 of the embodiment of FIG. 8B, taken generally along the longitudinal centerline or axis 14 and with the switch bracket 480 removed. In this view, the forward axis 508 that is defined normal to the first side 452 of the heat sink or frame 440 is shown oriented upward in the drawing and placed at the location of the machine screw 478 and spacer 512 securing the PC board 442 to the frame 440. The individual lens/LED assemblies 155 (associated with their respective lenses 454, 456, 458, and 460) are shown installed in their respective recesses 514, 516, 518, and 520. In practice, a very thin layer of thermally conductive, double-sided tape (not shown) or other thermal compound of the type well-known to persons skilled in the art may be placed in the interface between each LED/lens assembly and the recess in the heat sink/frame 440.

Of particular interest in this view in FIG. 8D is the orientation of the individual lens/LED assemblies 155 in their respective recesses as shown in cross section 514, 516, 518, and 520. Each of the recesses 514, 516, 518, and 520, and correspondingly the lens/LED assembly 155 installed therein, is tilted in a different azimuthal direction relative to the forward axis 508 of the first side 452 of the heat sink or frame 440. The lens/LED assembly 155 for the lens 454 installed in the recess 514 is shown tilted to the right in FIG. 8D by a predetermined angle of approximately 5°. That is, the approximate angle between the optical axis of the lens/LED assembly 155 for the lens 454 and a normal line passing through the LED at the plane of the frame 440 is approximately 5°. Similarly, the lens/LED assembly 155 for the lens 456 installed in the recess 516 is shown tilted into the plane of the drawing (i.e., away from the viewer) in FIG. 8D by a predetermined angle of approximately 5°. Further, the lens/LED assembly 155 for the lens 458 installed in the recess 518 is shown tilted out of the plane of the drawing (i.e., toward the viewer) in FIG. 8D by a predetermined angle of approximately 5°. Finally, the lens/LED assembly 155 for the lens 460 installed in the recess 520 is shown tilted to the left in FIG. 8D by a predetermined angle of approximately 5°. One can visualize the light emitting assembly 430 from a point directly above the forward axis 508, looking downward toward the assembly 430, wherein the optical axes of the four lens/LED assemblies 155 are tilted away from each other at 90° intervals relative to the position of the forward axis 508, substantially mimicking the four points of the compass, N, W, S, and E (for North, West, South, and East). This arrangement provides the projected flood light beam pattern as illustrated in FIG. 3 described herein above.

In the illustrated embodiment of the PLD 10, the predetermined angles of the optical axes of the individual lens/LED assemblies 155 is fixed at approximately 5° from the normal, i.e., from an axis parallel to the forward axis 508. As indicated previously, depending upon the beam width characteristics, number of light emitting assemblies, etc., the "predetermined angle" may vary. The range of variation may typically be within approximately +/−3° of the nominal 5° angle described for the illustrated embodiment. This range, it will be appreciated allows for a wide variation in the beam width characteristic in accordance with the one quarter beam width index also described herein above. In other embodiments, larger "predetermined angles," for example up to 15° may be employed to achieve particular illumination results. Moreover, while in most cases the predetermined angle is a non-zero angle, in some embodiments, at least one of the light emitting assemblies may be oriented with respect to the reference forward direction at a predetermined angle of zero degrees. Further, in other alternate embodiments, the angles of the optical axes may be varied or adjusted to provide a particular illumination characteristic. It is even possible, with suitable structural revisions apparent to persons skilled in the art, to provide for an adjustable flood light pattern by configuring the structure of the light emitting module 430 to vary the angles of the optical axes of the individual lens/LED assemblies 155.

Continuing with FIG. 8D, the fifth lens/LED assembly 157 will be described. The fifth assembly 157 may be identical with the lens/LED assembly 155 previously described with respect to FIG. 4C. However, the fifth lens/LED assembly 157, which may utilize a different lens or include an LED having a different operating power level to provide a spot light beam, is otherwise very similar to the lens/LED assembly 155. As before, the four individual forward (for the flood light beam) lens/LED assemblies 155 include the LED (actually inside the hemispherical dome 550) mounted on each base 510. The assembly thus includes the LED 510, the substrate 144 and the lens itself 454, 456, 458, or 460.

Joining the right-hand end 524 of the heat sink or frame 440 in FIG. 8D is the heat sink extension 470. Supported on the heat sink extension 470 is a fifth top (for the spot light beam) lens/LED assembly 157 (including the elements 530, 474, and 26) mounted within a cannister 472. The cannister 472 is supported directly against the PC board substrate 474 of the top lens/LED assembly 157 as held in place by the front lens support 476 acting in cooperation with the first array bezel 468 as previously described with FIG. 8A. The front lens support 476 has a lip that fits over a corresponding ridge formed in the first array bezel 468. Once the lip is engaged with the ridge, the front lens support 476 may be tilted toward the heat sink extension 470 until a resilient prong 540 having a hooked end 546 hooks through an edge of a hole formed in the heat sink extension 470, as shown in cross section in FIG. 8D.

FIG. 8D includes additional detail of the first 222 and second 232 ON/OFF switches, shown in their correct location but with the switch bracket 480 removed for clarity. The first switch 222, having a push button actuator 504, is shown enclosed within the cover 484 portion of the flexible sealing bezel 502. Similarly, the second switch 232, having a push button actuator 506, is shown enclosed within the cover 486 portion of the flexible sealing bezel 502. The first 222 and second 232 switches are mounted against a flat surface formed into the second side 462 of the heat sink or frame 440. Other structures shown in FIG. 8D have been previously described.

To summarize several of the features of the light emitting module of the illustrative embodiment of the present invention, an array of a plurality of compact light emitting assemblies is mounted on a frame configured as a heat sink. The frame serves the dual purpose of providing a structural platform and a thermal management component. The frame further provides features that ensures proper alignment of the light emitting devices wherein each light emitting assembly is preferably but not necessarily disposed at a non-zero predetermined angle relative to a forward axis normal to and defined at the location of the light emitting assembly. The predetermined angle is selected to aim the individual light emitting assemblies in a direction that provides a predetermined overlap of individual light beams of a given beam width preferably resulting in a uniform, high brightness pattern on a target surface. The source of current connected to the light emitting devices, as may be implemented on a printed circuit board, is also mounted on the frame, conveniently but not necessarily on the side of the frame opposite the light emitting assemblies. The compact light emitting module that is thus provided is readily adaptable to a variety of compact, high performance lighting product configurations.

Several aspects of the features of the optical system of the illustrative embodiment of the present invention include a unitary lens and light emitting device combination that produces a highly uniform beam of light, corrected for distortions and gaps in illumination, throughout a full beam width angle in the range of 40°+/−10°. This lens/LED combination or light source unit is adaptable for use principally in arrays of such light source units to provide optimum flood illumination from a portable, hand held task lamp product. The unitary lens is formed as a solid body lens which incorporates all of the necessary optical surfaces in a single piece unit, including the pattern-correcting spherical refracting surface, concave in the forward direction of illumination, that smooths out intensity variations in the overall illumination pattern. The light source unit provided by this lens/LED combination may be arranged in many different arrays formed of a plurality of such light source units for use in a wide variety of applications.

Several aspects of the features of the electrical circuit of the illustrative embodiment of the present invention include a single drive circuit that is configured to drive disparate current loads of first and second lighting arrays—combinations of compact light emitting devices—with the respective regulated constant currents. Further, a configuration of first and second standard push ON, push OFF, latching switches provides independent control of the two lighting loads wherein each switch operates in three states including momentary ON, continuous ON, and OFF. The circuit is readily adapted to providing continuous or pulsed drive to the lighting arrays. Also described are optional circuit features that provide a dimming control, a strobe control, and a low battery indicator.

Another aspect of the electric circuit utilizes a single pole, single throw switch having normally open contacts in a conductive path in a non-intuitive manner to sequentially provide three operable states including latched engagement (path closed, circuit OFF), momentary disengagement (path opened, circuit ON momentarily), and latched disengagement (path open, circuit ON until switch actuated).

All of the features summarized in the preceding paragraphs may be combined in a single combination task lamp and flashlight, providing a flood light having a uniform, high brightness beam pattern and a spot light having a narrower, more focused beam pattern, each type of beam independently controlled in a three-state sequence by simple push button switches. The two kinds of light beams are produced by separate arrays of compact light emitting devices, which are both driven by a single electrical circuit that provides disparate, regulated constant currents to the respective LEDs. The optics and electronics are constructed in a single, ruggedized, compact module, and the module enclosed within a slim, rugged housing and easily field replaceable with minimal tools.

While the invention has been shown and described with particularity in only one of its forms to illustrate the principles of the invention, the invention is not thus limited to the representative embodiment but is susceptible to various changes and modifications that may occur to persons skilled in the art in applying the invention to certain circumstances without departing from the scope of the appended claims. For example, while specific dimensions, angles, materials and processes are described for the representative embodiment, the invention is not limited to the specific example but allows substantial variation of structural features and processes within the range of equivalents that may occur to persons practicing the invention. Further, the numbers and arrangement of the LEDs may be altered, or the power levels changed to provide particular lighting performance. The colors of the LED emitters may be varied. The color of the lens unit or assembly or of the over lens may be varied or made interchangeable for specific purposes. The overall shape of the housing for the lamp may be varied to suit particular embodiments such as lanterns, area lighting, etc.

What is claimed is:

1. A lens for a light emitting device, comprising:
   an aspherical reflecting surface, having a focal point on an optical axis of symmetry, for reflecting light rays emitted from a source located approximately at the focal point in a forward direction and wherein the reflected light rays are emitted approximately within a predetermined angle with respect to the optical axis; and
   a spherical refracting surface disposed in the path of the reflected light rays emitted from the source, centered on and normal to the optical axis, concave in the forward direction of the reflected light rays and intersecting the aspherical reflecting surface at a boundary equidistant from the optical axis;
   wherein the spherical refracting surface includes a plurality of N concentric annular surfaces, each annular surface having a cross section convex in the forward direction and disposed substantially at uniform radial intervals between the optical axis and the intersection with the aspherical reflecting surface.

2. The lens of claim 1, wherein:
   the aspherical reflecting surface is defined by a parabola of revolution about the optical axis.

3. The lens of claim 1, further comprising:
   an aspherical refracting surface open toward the forward direction, disposed within the space enclosed within the aspherical reflecting surface and centered along the optical axis between the light source and the spherical refracting surface, for projecting rays of light emitted within a critical angle with respect to the optical axis into a forward beam.

4. The lens of claim 3, wherein:
the aspherical refracting surface is defined by a parabola of revolution about the optical axis.

5. The lens of claim 4, wherein:
the aspherical reflecting surface and the aspherical refracting surface are joined proximate their respective apexes by a cylindrical surface having a longitudinal axis coincident with the optical axis;
the cylindrical surface intersects the aspherical reflecting surface in a plane normal to the optical axis at the focal point; and
the cylindrical surface intersects the aspherical refracting surface defining a circle thereon that also defines a cone representing the boundary of the critical angle with respect to the focal point and the optical axis, wherein the included angle of the cone is equal to two times the critical angle.

6. The lens of claim 5, wherein:
the aspherical reflecting surface, the spherical refracting surface, the aspherical refracting surface and the cylindrical surface together comprise and define an outer surface of a solid body lens unit.

7. The lens of claim 6, wherein:
the solid body lens unit is molded of an optically clear thermoplastic material having a refractive index of at least 1.40.

8. The lens of claim 7, wherein:
the optically clear thermoplastic is selected from the group consisting of polycarbonate (PC), polymerized methyl methacrylate (PMMA), and polyethylene terephthalate (PET).

9. The lens of claim 1, further comprising in combination therewith:
a light emitting device (LED) disposed at the approximate focal point of the aspherical reflecting surface and emitting a substantially spherical wave front in the forward direction.

10. The lens of claim 1, further comprising in combination therewith:
a light emitting device (LED) situated at the spherical center of a hemispherical envelope attached thereto, disposed at the approximate focal point of the aspherical reflecting surface, and emitting a substantially spherical wave front in the forward direction through the hemispherical envelope.

11. The lens of claim 1, wherein:
the aspherical reflecting surface provides total internal reflection of light emitted from its approximate focal point and outside a cone defined by a critical angle bisected by the optical axis and having its apex at the focal point along the optical axis and opening in the direction of the emitted light.

12. The lens of claim 1, wherein:
at least N=3 concentric annular surfaces are disposed at approximately equal radial intervals on the spherical refracting surface and surrounding a fragment of a hemispherical surface disposed in the center of the spherical refracting surface, wherein the hemispherical surface fragment is pierced at its center by the optical axis.

13. The lens of claim 12, wherein;
N=7.

14. A forward array of a plurality of lens and LED combinations as recited in claim 9, wherein:
the focal points of the lens and LED combinations in the forward array are arranged in a plane according to a predetermined pattern and oriented to emit light in a forward direction from a first side of the plane.

15. The array of claim 14, wherein:
the plane is curved according to a predetermined configuration.

16. The array of claim 15, wherein:
the predetermined configuration of the curved plane is adjustable.

17. An array of lens and LED combinations as recited in claim 9, wherein the focal points of the lenses are disposed approximately in a plane, oriented to emit light in a forward direction from a first side of the plane, and spaced according to a predetermined pattern such that the optical axes of the lens and LED combinations are oriented substantially perpendicularly to the plane.

18. The array of claim 17, wherein:
the plane is curved according to a predetermined configuration.

19. The array of claim 18, wherein:
the predetermined configuration of the curved plane is adjustable.

20. The array of claim 14, wherein:
the pattern is a straight line and the optical axes of the lens and LED combinations pass through the straight line and are disposed at an emission angle with respect to a reference line normal to the plane.

21. The array of claim 14, wherein:
the pattern is a two dimensional array and the optical axes of the lens and LED combinations are disposed at an emission angle with respect to a reference line normal to the plane.

22. The array of claim 21, wherein:
the emission angle of each of the lens and LED combinations is a non-zero angle less than 15 degrees.

23. The array of claim 21, wherein:
the emission angle of at least one of the lens and LED combinations is zero degrees.

24. The array of claim 21, wherein:
the emission angle of each of the lens and LED combinations is between two and eight degrees.

25. The array of claim 21, wherein:
the emission angle of each of the lens and LED combinations is approximately five degrees.

26. The array of claim 14, wherein:
the pattern is a parallelogram and the optical axes of the lens and LED combinations pass through vertices of the parallelogram and are disposed at an emission angle with respect to a reference line normal to the plane; and wherein further the optical axes of the most widely separated pair of lens and LED combinations diverge from one another; and
the optical axes of the remaining pair of lens and LED combinations diverge from one another.

27. The array of claim 14, wherein:
the pattern is a circle and the optical axes of each of the lens and LED combinations pass through the circle at a predetermined emission angle with respect to a reference line passing through the center of the circle and normal to the plane.

28. The array of claim 27, wherein:
the emission angle of each of the lens and LED combinations is a non-zero angle less than 15 degrees.

29. The array of claim 27, wherein:
the emission angle of at least one of the lens and LED combinations is zero degrees.

30. The array of claim 27, wherein:
the emission angle of each of the lens and LED combinations is between two and eight degrees.

31. The array of claim 27, wherein:
the emission angle of each of the lens and LED combinations is approximately five degrees.

32. An array of a plurality of combinations of a lens and an LED as recited in claim 14, wherein further comprising in combination:
a single lens and LED combination configured for providing a single, substantially spot-like beam of light and disposed to emit light in a side direction approximately perpendicular to the emission direction of the forward array.

33. The array of claim 21, wherein:
the emission angles defined by the optical axis of each of the lens and LED combinations are disposed in accordance with a one quarter beam width relationship.

34. The array of claim 27, wherein:
the emission angles defined by the optical axis of each of the lens and LED combinations are disposed in accordance with a one quarter beam width relationship.

35. The array of claim 34, wherein:
the one quarter beam width relationship orients the emission axis of a light source in relation to the emission axes of an array of like light sources such that the emission axes are disposed at angles with respect to each other equal to approximately one quarter of the beam width of an individual light source.

36. The lens of claim 1, wherein the LED is selected from the group consisting of a semiconductor light emitting diode, an incandescent light emitting bulb, a gas discharge light emitting unit, an arc discharge light emitting unit, a halogen light emitting unit, a fluorescent light emitting unit, and an organic light emitting unit.

37. A lens for a light emitting device (LED), comprising:
a solid body formed of optically clear material and having a circular cross section, the lens being defined by first, second, third, and fourth surfaces concentrically aligned with a common optical axis of the lens; wherein the first surface defines an outer boundary of the solid body with respect to the optical axis and comprises an aspherical reflecting surface for providing total internal reflection of light emission in a forward direction from a location approximately at a focus of the aspherical reflecting surface;

the second surface defines a forward boundary of the solid body and comprises a spherical refracting surface that is concave in the forward direction of light emission and intersects the first surface at the perimeter of the second surface;

the third surface defines a hollow cylindrical surface concentric with the optical axis and having a diameter substantially less than the diameters of the first and second surfaces, wherein the third surface intersects the first surface at a rearward boundary of the first surface and extends toward the forward boundary of the second surface by a predetermined distance; and the fourth surface defines a forward boundary of the third surface and comprises an aspherical refracting surface that is concave in the forward direction; and wherein further the second surface includes a plurality of N concentric annular fifth surfaces, each convex in the forward direction and disposed at substantially uniform radial intervals between the optical axis and the perimeter of the second surface.

* * * * *